(12) United States Patent
Chen

(10) Patent No.: US 10,887,667 B2
(45) Date of Patent: *Jan. 5, 2021

(54) FLAGGING ADVERTISEMENT FRAMES FOR AUTOMATIC CONTENT RECOGNITION

(71) Applicant: The Nielsen Company (US), LLC, New York, NY (US)

(72) Inventor: Juikun Chen, West Jordan, UT (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/409,733

(22) Filed: May 10, 2019

(65) Prior Publication Data

US 2019/0268670 A1 Aug. 29, 2019

Related U.S. Application Data

(63) Continuation of application No. 15/703,391, filed on Sep. 13, 2017, now Pat. No. 10,306,333.

(51) Int. Cl.
*H04N 21/81* (2011.01)
*H04N 21/2389* (2011.01)
(Continued)

(52) U.S. Cl.
CPC ....... *H04N 21/812* (2013.01); *G06K 9/00744* (2013.01); *H04N 21/23892* (2013.01); *H04N 21/435* (2013.01); *H04N 21/44008* (2013.01)

(58) Field of Classification Search
CPC .... H04N 19/00; H04N 19/136; H04N 19/186; H04N 1/32165; H04N 1/32267;
(Continued)

(56) References Cited

U.S. PATENT DOCUMENTS 8,358,381 B1 1/2013 Diard
8,688,731 B2 4/2014 Ramanathan et al.
(Continued)

FOREIGN PATENT DOCUMENTS

EP 2437498 A1 4/2012
EP 2982131 A4 1/2017
(Continued)

OTHER PUBLICATIONS

International Search Report and Written Opinion dated Nov. 29, 2018 in connection with International Application No. PCT/US2018/050184, 9 pages.
(Continued)

*Primary Examiner* — Omar S Parra
(74) *Attorney, Agent, or Firm* — McDonnell Boehnen Hulbert & Berghoff LLP

(57) ABSTRACT

A method for flagging advertisement frames for automatic content recognition is provided. The method includes receiving broadcast fingerprints indicative of broadcast frames of a media stream comprising a series of broadcast scenes. The method also includes receiving advertisement fingerprints indicative of ad frames of ad scenes. The method further includes determining a scene change between a first broadcast scene and a second broadcast scene. The scene change is based on a Pearson correlation coefficient between an initial broadcast fingerprint of an initial broadcast frame of the second broadcast scene and a last broadcast fingerprint of a last broadcast frame of the first broadcast scene. The method also further includes determining whether the second broadcast scene is one of the ad scenes. When the second broadcast scene is one of the ad scenes, the method associates an identification of the second broadcast scene as the one of the ad scenes.

30 Claims, 10 Drawing Sheets

(51) Int. Cl.
   *H04N 21/44* (2011.01)
   *H04N 21/435* (2011.01)
   *G06K 9/00* (2006.01)
(58) Field of Classification Search
   CPC ........... H04N 21/23418; H04N 21/812; H04N 21/835; H04N 21/2668; H04N 21/44008; H04N 21/44204; H04N 21/83; G06K 9/00744
   See application file for complete search history.

(56) References Cited

U.S. PATENT DOCUMENTS

| 8,786,785 | B2 | 7/2014 | Hendrickson et al. |
| 9,280,977 | B2 | 3/2016 | Sharma |
| 2004/0237102 | A1 | 11/2004 | Konig et al. |
| 2016/0286285 | A1 | 9/2016 | Geyzel et al. |
| 2017/0118538 | A1 | 4/2017 | Ashbacher |

FOREIGN PATENT DOCUMENTS

| JP | 2008011316 A | 1/2008 |
| WO | 2016031626 A1 | 3/2016 |
| WO | 2016200622 A1 | 12/2016 |
| WO | 2017044258 A1 | 3/2017 |
| WO | 2017074634 A1 | 5/2017 |

OTHER PUBLICATIONS

Lu, S. et al., 'Adaptive Reference Frame Selection for Near-duplicate Video Shot Detection', 2010 IEEE International Conference on Image Processing, Sep. 26-29, 2010, Hong Kong, China.

Tippaya, S. et al., 'A Study of Discriminant Visual Descriptors for Sort Video Shot Boundary Detection', 2015 10th Asian Control Conference (ASCC), May 31-Jun. 3, 2015, Kota Kinabalu, Malaysia.

Tippaya, S. et al., 'Video Shot Boundary Detection based on Candidate Segment Selection and Transition Pattern Analysis', 2015 IEEE International Conference on Digital Signal Processing (DSP), Jul. 21-24, 2015, Singapore.

US 10,887,667 B2

FLAGGING ADVERTISEMENT FRAMES FOR AUTOMATIC CONTENT RECOGNITION

CROSS-REFERENCE TO RELATED APPLICATION

This disclosure is a continuation of U.S. patent application Ser. No. 15/703,391, filed Sep. 13, 2017, the entirety of which is hereby incorporated by reference.

TECHNICAL FIELD

This disclosure relates to flagging advertisement frames during automatic content recognition.

BACKGROUND

Media devices today are becoming more and more common and may range from fixtures in a home, such as a television, to mobile devices traveling along with a media consumer. Media devices, such as televisions, set-top-boxes, mobile phones, laptops, and tablets, may access and may retrieve media content from a variety of sources. For example, a media device may receive media content via satellite, over-the-air broadcasting, or streaming systems from a wired or a wireless connection. As the use of media devices continues to increase, media device connectivity to media content has also increased. With this growth, new media content markets have emerged and old media content market have adapted to understand and to provide contextually-relevant media content to the media consumer.

SUMMARY

One aspect of the disclosure provides a method for flagging advertisement frames for automatic content recognition. The method includes receiving, at data processing hardware, broadcast fingerprints indicative of broadcast frames of a media stream. The media stream includes a series of broadcast scenes. The method also includes receiving, at the data processing hardware, advertisement (ad) fingerprints indicative of ad frames of ad scenes. The method includes determining, by the data processing hardware, a scene change between a first broadcast scene and a second broadcast scene. The scene-change is based on a scene-change Pearson correlation coefficient between an initial broadcast fingerprint of an initial broadcast frame of the second broadcast scene and a last broadcast fingerprint of a last broadcast frame of the first broadcast scene. The method also determines, by the data processing hardware, whether the second broadcast scene is one of the ad scenes. When the second broadcast scene is one of the ad scenes, the method associates, by the data processing hardware, an identification of the second broadcast scene as the one of the ad scenes.

Implementations of the disclosure may include one or more of the following optional features. In some implementations, the scene change includes determining the scene-change Pearson correlation coefficient between the initial broadcast fingerprint of the initial broadcast frame of the second broadcast scene and the last broadcast fingerprint of the last broadcast frame of the first broadcast scene. The scene change may also include determining, by the data processing hardware, that the scene-change Pearson correlation coefficient satisfies a scene-change correlation threshold.

In some examples, the method includes determining the scene change for each sequentially adjacent pair of broadcast frames. In this example, the method may determine the scene-change Pearson correlation coefficient between a first broadcast fingerprint of a first broadcast frame of the pair of broadcast frames and a second broadcast fingerprint of a second broadcast frame of the pair of broadcast frames. The method may also determine, by the data processing hardware, whether the scene-change Pearson correlation coefficient satisfies a scene-change correlation threshold. When the scene-change Pearson correlation coefficient satisfies the scene-change correlation threshold, the method may identify the first broadcast frame of the pair of broadcast frames as a last broadcast frame of a corresponding broadcast scene. When the scene-change Pearson correlation coefficient satisfies the scene-change correlation threshold, the method may also identify the second broadcast frame of the pair of broadcast frames as an initial broadcast frame of a corresponding sequentially adjacent broadcast scene.

In some configurations, the method includes waiting a threshold time period after the last broadcast fingerprint of the last broadcast frame of the first broadcast scene before determining whether the second broadcast scene is one of the ad scenes. Determining whether the second broadcast scene is one of the ad scenes for each ad fingerprint may include determining, by the data processing hardware, a match Pearson correlation coefficient between the respective ad fingerprint and the second broadcast fingerprint. The method may also include determining, by the data processing hardware, whether the match Pearson correlation coefficient satisfies a match correlation threshold. When the match Pearson correlation coefficient satisfies the match correlation threshold, the method may identify, by the data processing hardware, the second broadcast scene as corresponding to the ad scene of the respective ad fingerprint.

In some implementations, the second broadcast scene may be one of the ad scenes. In these implementations, the method may determine, by the data processing hardware, whether the second broadcast scene is within or sequentially adjacent another ad scene. The method may also associate, by the data processing hardware, an ad identifier with the second broadcast scene.

In some examples, each fingerprint represents at least one pixel of the corresponding frame. Each fingerprint may also include an average pixel value representing a sum of grayscale values of the corresponding frame. Additionally or alternatively, each fingerprint may represent a 16 integer vector corresponding to average pixel values of sixteen sub-frames, the sixteen sub-frames defining a four by four array of the corresponding frame.

Another aspect of the disclosure provides a method for flagging advertisement frames for automatic content recognition. The method includes receiving, at data processing hardware, broadcast fingerprints indicative of broadcast frames of a media stream. The method also includes receiving, at the data processing hardware, advertisement (ad) fingerprints indicative of ad frames of ad scenes. For each sequentially adjacent pair of broadcast frames, the method includes determining, by the data processing hardware, a scene-change Pearson correlation coefficient between a first broadcast fingerprint of a first broadcast frame of the pair of broadcast frames and a second broadcast fingerprint of a second broadcast frame of the pair of broadcast frames. For each sequentially adjacent pair of broadcast frames, the method further determines, by the data processing hardware, whether the scene-change Pearson correlation coefficient satisfies a scene-change correlation threshold. When the scene-change Pearson correlation coefficient satisfies the scene-change correlation threshold, the method identifies, by the data processing hardware, a first broadcast scene as ending at the first broadcast frame and a second broadcast scene as starting at the second broadcast frame. For each ad fingerprint, when the scene-change Pearson correlation coefficient satisfies the scene-change correlation threshold, the method determines, by the data processing hardware, a match Pearson correlation coefficient between the respective ad fingerprint and the second broadcast fingerprint and whether the match Pearson correlation coefficient satisfies a match correlation threshold. When the match Pearson correlation coefficient satisfies the match correlation threshold, the method includes identifying, by the data processing hardware, the second broadcast scene as the ad scene of the respective ad fingerprint.

Implementations of the disclosure may include one or more of the following optional features. In some examples, when the second broadcast scene is one of the ad scenes, the method includes determining, by the data processing hardware, whether the second broadcast scene is within or sequentially adjacent another ad scene. When the second broadcast scene is one of the ad scenes, the method may further include associating, by the data processing hardware, an ad identifier with the second broadcast scene.

In some implementations, each fingerprint represents at least one pixel of the corresponding frame. Additionally or alternatively, each fingerprint may also represents a 16 integer vector corresponding to average pixel values of sixteen sub-frames, the sixteen sub-frames defining a four by four array of the corresponding frame.

Another aspect of the disclosure provides a system for flagging advertisement frames for automatic content recognition. The system includes data processing hardware and memory hardware in communication with the data processing hardware. The memory hardware stores instructions that when executed on the data processing hardware cause the data processing hardware to perform operations. The operations include receiving broadcast fingerprints indicative of broadcast frames of a media stream. The media stream includes a series of broadcast scenes. The operations also include receiving advertisement (ad) fingerprints indicative of ad frames of ad scenes. The operations further include determining a scene change between a first broadcast scene and a second broadcast scene based on a scene-change Pearson correlation coefficient. The scene-change Pearson correlation coefficient is between an initial broadcast fingerprint of an initial broadcast frame of the second broadcast scene and a last broadcast fingerprint of a last broadcast frame of the first broadcast scene. The operations also include determining whether the second broadcast scene is one of the ad scenes. When the second broadcast scene is one of the ad scenes, the operations include associating an identification of the second broadcast scene as the one of the ad scenes.

Implementations of the disclosure may include one or more of the following optional features. In some examples, the system includes determining the scene change. In these examples, the scene change may include determining the scene-change Pearson correlation coefficient between the initial broadcast fingerprint of the initial broadcast frame of the second broadcast scene and the last broadcast fingerprint of the last broadcast frame of the first broadcast scene. The system may also include determining that the scene-change Pearson correlation coefficient satisfies a scene-change correlation threshold.

In some configurations, for each sequentially adjacent pair of broadcast frames, determining the scene change includes determining the scene-change Pearson correlation coefficient between a first broadcast fingerprint of a first broadcast frame of the pair of broadcast frames and a second broadcast fingerprint of a second broadcast frame of the pair of broadcast frames. For each sequentially adjacent pair of broadcast frames, determining the scene change may also include determining whether the scene-change Pearson correlation coefficient satisfies a scene-change correlation threshold. When the scene-change Pearson correlation coefficient satisfies the scene-change correlation threshold, the system may include identifying the first broadcast frame of the pair of broadcast frames as a last broadcast frame of a corresponding broadcast scene. The system may also include identifying the second broadcast frame of the pair of broadcast frames as an initial broadcast frame of a corresponding sequentially adjacent broadcast scene. The operations may further include waiting a threshold time period after the last broadcast fingerprint of the last broadcast frame of the first broadcast scene before determining whether the second broadcast scene is one of the ad scenes.

In some implementations, determining whether the second broadcast scene is one of the ad scenes for each ad fingerprint includes determining a match Pearson correlation coefficient between the respective ad fingerprint and the second broadcast fingerprint and determining whether the match Pearson correlation coefficient satisfies a match correlation threshold. When the match Pearson correlation coefficient satisfies the match correlation threshold, the system may identify the second broadcast scene as corresponding to the ad scene of the respective ad fingerprint.

In some examples, when the second broadcast scene is one of the ad scenes, the operations further include determining whether the second broadcast scene is within or sequentially adjacent another ad scene. Additionally or alternatively, when the second broadcast scene is one of the ad scenes, the operations may include associating an ad identifier with the second broadcast scene. In the system, each fingerprint may represent at least one pixel of the corresponding frame. Each fingerprint may also include an average pixel value representing a sum of grayscale values of the corresponding frame. Each fingerprint may further represent a 16 integer vector corresponding to average pixel values of sixteen sub-frames, the sixteen sub-frames defining a four by four array of the corresponding frame.

Yet another aspect of the disclosure provides for a system for flagging advertisement frames for automatic content recognition. The system includes data processing hardware and memory hardware in communication with the data processing hardware. The memory hardware stores instructions that when executed on the data processing hardware cause the data processing hardware to perform operations. The operations include receiving broadcast fingerprints indicative of broadcast frames of a media stream. The operations further include receiving advertisement (ad) fingerprints indicative of ad frames of ad scenes. For each sequentially adjacent pair of broadcast frames, the operations also include determining a scene-change Pearson correlation coefficient between a first broadcast fingerprint of a first broadcast frame of the pair of broadcast frames and a second broadcast fingerprint of a second broadcast frame of the pair of broadcast frames. For each sequentially adjacent pair of broadcast frames, the operations further include determining whether the scene-change Pearson correlation coefficient satisfies a scene-change correlation threshold. When the scene-change Pearson correlation coefficient satisfies the scene-change correlation threshold, the operations include identifying a first broadcast scene as ending at the first broadcast frame and identifying a second broadcast scene as starting at the second broadcast frame. For each ad fingerprint the operations further include determining a match Pearson correlation coefficient between the respective ad fingerprint and the second broadcast fingerprint and determining whether the match Pearson correlation coefficient satisfies a match correlation threshold. When the match Pearson correlation coefficient satisfies the match correlation threshold, the operations include identifying the second broadcast scene as the ad scene of the respective ad fingerprint.

Implementations of the disclosure may include one or more of the following optional features. In some implementations, when the second broadcast scene is to one of the ad scenes, the operations further include determining whether the second broadcast scene is within or sequentially adjacent another ad scene. When the second broadcast scene is one of the ad scenes, the operations may include associating an ad identifier with the second broadcast scene. Each fingerprint may represent at least one pixel of the corresponding frame. Each fingerprint may also represent a 16 integer vector corresponding to average pixel values of sixteen sub-frames, the sixteen sub-frames defining a four by four array of the corresponding frame The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Generally, automatic content recognition (ACR) is the process of automatically identifying media content on a media device or within a media file. ACR has become increasingly useful to identify vast amounts of media content consumed by society every day. From a commercial perspective, ACR may allow businesses and other entities to understand media content consumption and, perhaps more effectively, to market or to target consumers (i.e., media device users) of the media content. For example, an advertisement or an offer is likely more effective when the advertisement is personalized to the user of a media device. Accordingly, broadcasters, commercial providers, advertisers and other entities want to know what programs are being viewed or, more particularly, where the user is in the program during viewing. With this type of information, the media device user may receive more precisely catered media content.

In an approach to understand and to identify media content, a system may, as a precursor, identify advertisements (ads) that a broadcaster or other content provider distributes to a media content consumer. By identifying ads up front, the broadcaster or other content provider may more efficiently and more effectively perform ACR at a media device. Identified advertisements may then be replaced, overlaid, or modified to target consumers of the media content as a part of or a result of the ACR functionality.

Figure 1A:
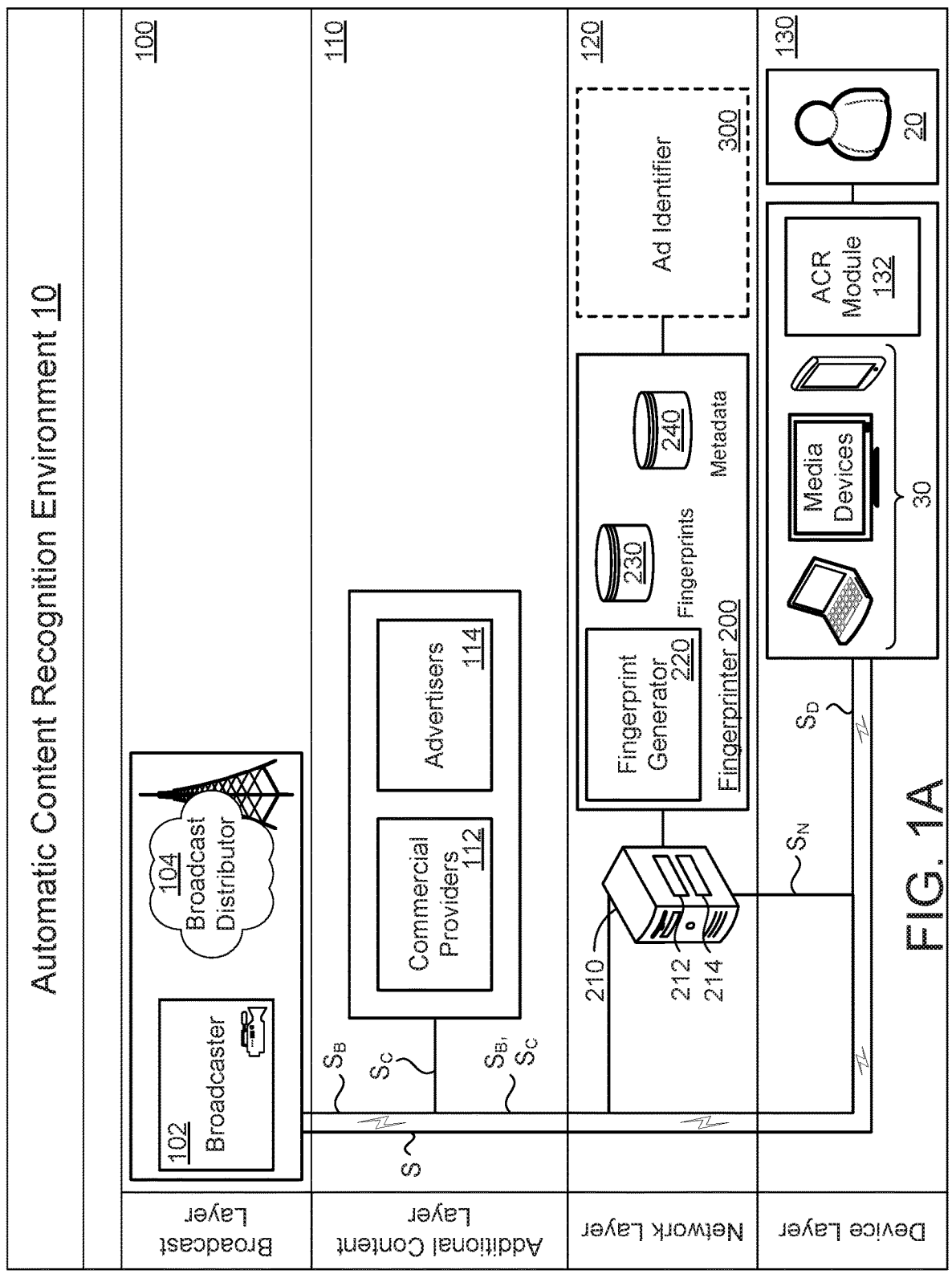
FIGS. 1A and 1B are schematic views of an example of an automatic content recognition environment.

FIG. 1A is an example of an ACR environment 10. The ACR environment 10 may include several layers to distribute media content to a user 20 (i.e., a viewer) of a media device 30. FIG. 1A attempts to simplify the media content distribution process into four layers: a broadcast layer 100; an additional content layer 110; a network layer 120; and a device layer 130. Each layer 100, 110, 120, 130 may have entities that influence a media stream S. The broadcast layer 100 represents broadcast entities that may be involved to produce a broadcast media stream $S_B$. These broadcast entities may include a broadcaster 102 and a broadcast distributor 104. The broadcaster 102 may be one or more media content providers, such as local broadcasters, multi-channel networks, or other media content owners. The broadcast distributor 104 is a broadcast entity that provides infrastructure or resources (e.g., signal wires, communication towers, communication antennas, servers, etc.) to distribute media content. The broadcaster 102 and the broadcast distributor 104 may be the same broadcast entity or a different broadcast entity depending on broadcasting variables, such as a type of media content being provided or a type of media device receiving the media content.

In some implementations, the media stream S includes an additional media content stream $S_C$ from content entities represented as the additional content layer 110. These content entities include commercial providers 112, advertisers 114, or other entities contributing additional media content to the media stream S. Generally, commercial providers 112 are content entities that procure and/or host the additional media content stream $S_C$, while advertisers 114 are content entities that generate the additional media content stream $S_C$, such as advertisements, offers, deals, discounts, benefits, or other promotions of goods and/or services. Additionally or alternatively, the commercial providers 112 and the advertisers 114 may be the same content entity. The additional content layer 110 may communicate the additional media content stream $S_C$ to the broadcast layer 100, the network layer 120, the device layer 130, or any combination thereof. Optionally, the additional content layer 110 may pair the additional media content stream $S_C$ with the broadcast media stream $S_B$ to form the media stream S that includes the broadcast media stream $S_B$ and the additional media content stream $S_C$.

Referring further to FIG. 1A, the network layer 120 is configured to receive the broadcast media stream $S_B$ and the additional media content stream $S_C$ from the broadcast layer 100 and/or the additional content layer 110. For example, if the network layer 120 receives the media stream S from the broadcast layer 100, the network layer 120 may receive the broadcast media stream $S_B$ with the additional media content stream $S_C$ or independent of the additional media content stream $S_C$. Similarly, if the network layer 120 receives the media stream S from the additional content layer 110, the network layer 120 may receive the broadcast media stream $S_B$ with the additional media content stream $S_C$ or independent of the additional media content stream $S_C$. In some implementations, the network layer 120 may pair the broadcast media stream $S_B$ from the broadcast layer 100 with the additional media content stream $S_C$ from the additional content layer 110 to generate a network media stream $S_N$ representing the broadcast media stream $S_B$ impregnated with the additional media content stream $S_C$.

The network layer 120 includes a fingerprinter 200. The fingerprinter 200 is configured to operate on a server 210 having data processing hardware 212 and memory hardware 214. The fingerprinter 200 includes a fingerprint generator 220. The network layer 120 may be configured to store fingerprints 222 and metadata 224 related to the fingerprints 222 in a fingerprint database 230, such as a broadcast fingerprint database or an ad fingerprint database, and/or a metadata database 240. The network layer 120 may be configured to generate fingerprints 222 via the fingerprint generator 220 or to receive fingerprints 222 from another content entity within the ACR environment 10. For example, the network layer 120 receives ad fingerprints 222, 222a indicative of ad frames $F_{ad}$ from the broadcast layer 100 and/or the additional content layer 110. Generally, a fingerprint 222 is at least one unique identifier corresponding to at least one frame Fn of the media stream S. For example, the at least one unique identifier may be a value (e.g., pixel value), an alphanumeric representation, or a compressed version of the audio visual image. Additionally or alternatively, the network layer 120 is configured to store the broadcast media stream $S_B$, the additional media content stream $S_C$, or both.

The network layer 120 further includes an ad identifier 300. FIG. 1A depicts the ad identifier 300 with a dotted box to represent that the ad identifier 300 may actually exist on other layers besides the network layer 120 (i.e., the broadcast layer 100, the additional content layer 110, or the device layer 130). The ad identifier 300 is configured to receive fingerprints 222 and to determine whether the fingerprints 222 correspond to an ad. In some examples, the ad identifier 300 receives ad fingerprints 222, 222a and indicates when broadcast fingerprints 222, 222b correspond to the ad fingerprints 222, 222a. Content entities from other layers, such as the broadcaster 102, the broadcast distributor 104, commercial providers 112, or advertisers 114, may provide the ad identifier 300 with ad frames $F_{ad}$ and/or ad fingerprints 222, 222a. When the ad identifier 300 determines broadcast fingerprints 222, 222b correspond to the ad fingerprints 222, 222a, the ad identifier 300 may communicate an identification 332 to one or more content entities, ACR modules 132, and/or media devices 30 within the ACR environment 10.

FIG. 1A also illustrates that any layer (i.e., the broadcast layer 100, the additional content layer 110, or the network layer 120) may communicate with the device layer 130. At the device layer 130, media devices 30, such as televisions, set-top-boxes, PCs, laptops, tablets, or mobile phones, receive a media device stream $S_D$ (e.g., any combination of the broadcast media stream $S_B$, the additional content stream $S_C$, or the network media stream $S_N$) and may convey all or a portion of the corresponding media device stream $S_D$ (e.g., any combination of the broadcast media stream $S_B$, the additional content stream $S_C$, or the network media stream $S_N$) to a user 20. A device may mean any hardware or any software related to a media device 30 configured to receive or to communicate some form of media content. Moreover, the device may include data processing hardware and/or memory hardware. In some implementations, the media devices 30 may be configured to interpret or to interact with the corresponding media stream (e.g., any combination of the broadcast media stream $S_B$, the additional content stream $S_C$, or the network media stream $S_N$). For example, the media devices 30 identify the additional media content stream $S_C$ from the broadcast media stream $S_B$. The media devices 30 may replace or overlay the additional media content stream $S_C$ of the broadcast media stream $S_B$ with replacement media content. The media devices 30 may filter the media stream S for predefined content. Additionally or alternatively, the media devices 30 may be configured to communicate information or data related to the media stream (e.g., any combination of the broadcast media stream $S_B$, the additional content stream $S_C$, or the network media stream $S_N$) with the broadcast layer 100, the additional content layer 110, the network layer 120, or other media devices 30 of the device layer 130. The media device 30 may execute an ACR module 132 or be in communication with other data processing hardware executing the ACR module 132. The ACR module 132 may be configured to identify a content element (e.g., audio, video, or digital image) within a media stream based on sampling a portion of the media stream, processing the sample, and comparing the sample with a source service that identified content by unique characteristics, such as audio or video fingerprints or watermarks.

Figure 1B:
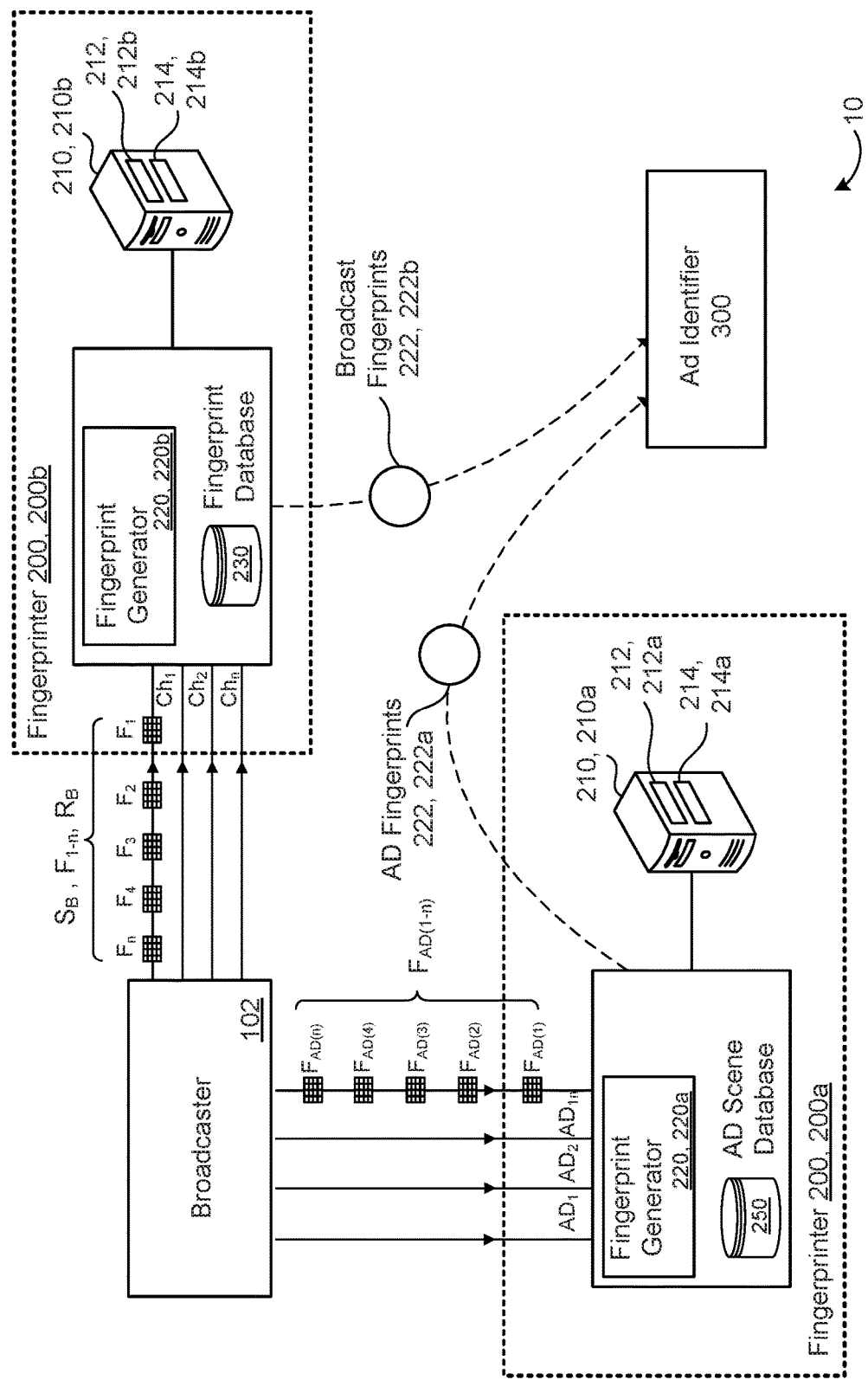

FIG. 1B illustrates an example ACR environment 10. The ACR environment 10 includes a broadcaster 102, an ad fingerprinter 200, 200a, a broadcast fingerprinter 200, 200b, and an ad identifier 300. In some examples, the ad fingerprinter 200, 200a and the broadcast fingerprinter 200, 200b are the same fingerprinter 200, but for simplicity, the ACR environment 10 of FIG. 1B has a fingerprinter 200 generating fingerprints 222 for each of the ad frames $F_{ad}$ (the ad fingerprinter 200, 200a) and the broadcast frames $F_{B(1-n)}$ (the broadcast fingerprinter 200, 200b). Here, the broadcaster 102 communicates ad frames $F_{ad(1-n)}$ to the ad fingerprinter 200, 200a. The ad frames $F_{ad(1-n)}$ correspond to advertisements that may be divided into ad scenes 302, 302a. Each ad scene 302, 302a may relate to part of or an entire advertisement. As an example, advertisements vary in length (e.g., one minute ads, thirty second ads, fifteen second ads, ten second ads, etc.); therefore, to standardize frame analysis, each advertisement is reduced a discrete number of ad frames $F_{ad(1-n)}$ corresponding to an ad scene 302, 302a. The ad fingerprinter 200, 200a may generate ad fingerprints 222, 222a at an ad fingerprint generator 220, 220a for each ad frame $F_{ad(1-n)}$ and store the ad fingerprints 222, 222a in an ad scene database 250 according to ad scenes 302, 302a. Generally, an ad fingerprint 222, 222a is at least one unique identifier corresponding to at least ad frame $F_{ad(1-n)}$. Additionally or alternatively, a content entity besides the broadcaster 102 may communicate the ad frames $F_{ad(1-n)}$ to the ad fingerprinter 200, 200a. With the ad fingerprints 222, 222a, the ad fingerprinter 200, 200a may then send ad fingerprints 222, 222a to the ad identifier 300. The ad fingerprints 222, 222a may automatically be sent to the ad identifier 300 or the ad identifier 300 may query or may retrieve at least one ad fingerprint 222, 222a for ad identification.

Referring further to FIG. 1B, the broadcaster 102 broadcasts the broadcast media stream $S_B$ by channels $Ch_{1-n}$ to the broadcast fingerprinter 200, 200b at a broadcast frame rate RB. The broadcast frame rate RB divides the broadcast media stream $S_B$ into broadcast frames $F_{B(1-n)}$ such that each broadcast frame $F_{B(1-n)}$ corresponds to an audio visual image represented by pixels within the broadcast media stream $S_B$. The broadcast fingerprinter 200, 200b is configured to receive each broadcast frame $F_{B(1-n)}$ at the broadcast fingerprint generator 220, 220b. The broadcast fingerprint generator 220, 220b receives each broadcast frame $F_{B(1-n)}$ and is configured to generate broadcast fingerprints 222, 222b indicative of each broadcast frame $F_{B(1-n)}$. Generally, a broadcast fingerprint 222, 222b is at least one unique identifier corresponding to at least one broadcast frame $F_{B(1-n)}$.

The fingerprinter 200, 200b may store each broadcast fingerprint 222, 222b in a database, such as the fingerprint database 230. In some examples, a fingerprinter 200 stores each fingerprint 222 according to or along with metadata 224 corresponding to the frame F, such as a frame location (e.g., a frame time code), a type of frame (e.g., live program or advertisement), or a fingerprint identifier tag. In other examples, the fingerprinter 200 has a separate database or databases corresponding to the metadata 224 of each fingerprint 222. A separate database for metadata 224 may allow the fingerprinter 200 to store more fingerprints 222. The broadcast fingerprinter 200, 200b may then communicate the broadcast fingerprints 222, 222b to the ad identifier 300.

In some examples, the ad identifier 300 receives ad fingerprints 222, 222a from the ad fingerprinter 200, 200a and broadcast fingerprints 222, 222b from the broadcast fingerprinter 200, 200b. The ad identifier 300 may compare a broadcast fingerprint 222, 222b to the ad fingerprints 222, 222a to identify when a broadcast fingerprint 222, 222b is also an ad fingerprint 222, 222a. In other words, the ad identifier 300 identifies that a broadcast frame $F_{B(1-n)}$ matches an ad frame $F_{ad}$.

Figure 2:
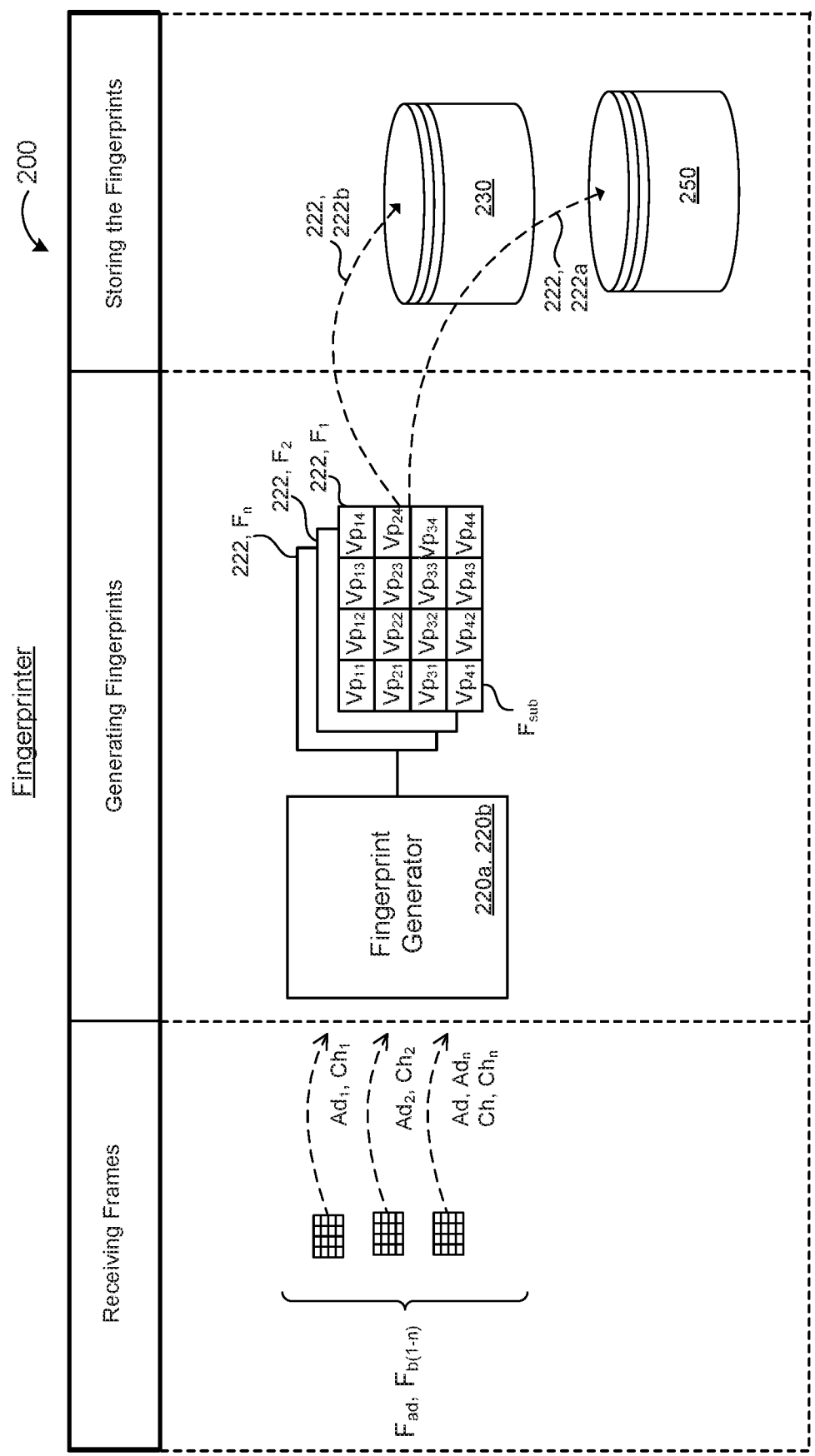
FIG. 2 is a schematic view of an example server of the automatic content recognition environment.

FIG. 2 is an example of fingerprint generator 220 of the fingerprinter 200. The fingerprint generator 220 receives the frames $F_{1-n}$ (broadcast frames $F_{B(1-n)}$ or ad frames $F_{ad(1-n)}$) corresponding to channels $Ch_{1-n}$ or advertisements $Ad_{(1-n)}$ of the broadcast media stream $S_B$. The fingerprint generator 220 may generate a fingerprint 222 for each received frame $F_{1-n}$ and may store the fingerprint 222 in the database, such as the fingerprint database 230 or the ad scene database 250. In some examples, each fingerprint 222 represents at least one pixel value $V_P$ of the frame $F_{1-n}$ of the corresponding channel Ch or advertisement Ad. The at least one pixel value $V_P$ may be an average pixel value or a sum of color space values of the frame $F_{1-n}$. For example, the at least one pixel value $V_P$ may represent a sum and/or average of grayscale values of a corresponding frame $F_{1-n}$ when the fingerprint generator 220 generates a fingerprint 222 according to a gray-UV (YUV) color space. In other words, each pixel of the corresponding frame $F_{1-n}$ is represented by a grayscale value such that the fingerprint 222 represents the sum and/or average of the grayscale values of a pixel area. In some implementations, the fingerprint 222 (e.g., the ad fingerprint 222, 222a or the broadcast fingerprint 222, 222b) is a unique identifier based on sub-frames $F_{sub}$ of the corresponding frame $F_{1-n}$. Depending on the pixels per sub-frame $F_{sub}$, each sub-frame $F_{sub}$ may have a corresponding pixel value $V_p$ or a corresponding average pixel value.

FIG. 2 also illustrates an example of a fingerprint 222, $F_{1-n}$ corresponding to a frame F (e.g., a broadcast frame $F_{B(1-n)}$ or an ad frame $F_{ad}$) divided into sub-frames $F_{sub}$. In some examples, the fingerprint generator 220 divides each frame F into sub-frames $F_{sub}$ to more accurately compare or to distinguish between frames $F_{1-n}$. With sub-frames $F_{sub}$, each fingerprint 222 (e.g., an ad fingerprint 222, 222a or a broadcast fingerprint 222, 222b) may represent more than one average pixel value $V_p$ of the corresponding frame $F_{1-n}$. By dividing each frame $F_{1-n}$ into sub-frames $F_{sub}$, more details (e.g., pixels of each sub-frame $F_{sub}$) are taken into account during fingerprint generation than fingerprints 222 based on a pixel value $V_P$ (or average pixel value) of an entire frame $F_{1-n}$. As such, the number of sub-frames $F_{sub}$ that the fingerprint generator 220 divides each frame into depends on a desired level of accuracy. For example, as shown in FIG. 2, the fingerprint generator 220 divides each frame into sixteen sub-frames $F_{sub}$ defining a four by four array. Each sub-frame $F_{sub}$ of the sixteen sub-frames $F_{sub}$ has an average pixel value $V_{p11-44}$ such that each fingerprint 222 represents each corresponding frame by a sixteen value integer vector having an integer value associated with each sub-frame $F_{sub}$. Although the figures may depict each frame $F_{1-n}$ or each media device frame $F_{D1-n}$ as a four by four array, any sub-frame division is possible.

Traditionally, comparisons between fingerprints 222 (e.g., between ad fingerprints 222, 222a and broadcast fingerprints 222, 222b) suffer from resolution issues. For example, some systems typically index frames $F_{(1-n)}$ according to a rank of an average pixel value $V_P$ corresponding to each frame F. By indexing according to rank, the rank may be more skewed by pixel value outliers. Additionally, with the rank as a single pixel value $V_P$, the system may be less sensitive to changes in the pixels. As an illustrative metaphor, scientific measurements include significant figures that are digits of a number indicative of a degree of accuracy. For example, a measurement of one significant figure, 0.1, is only accurate to a tenths place and may range anywhere from 0.10 to 0.19; whereas, a measurement of two significant figures, 0.12, is accurate to a hundredths place and may range from 0.120 to 0.129. In other words, a fingerprint 222 according to rank of a single pixel value $V_P$ is like one significant figure while a fingerprint 222 according to a vector of multiple pixel values $V_P$ is like more than one significant figure. The fingerprint 222 according to rank may allow greater pixel variation without accounting for this variation; therefore, the rank is less likely to be truly representative of pixels of a frame F when compared to a fingerprint 222 that is a vector representation of multiple pixels values $V_P$ of a frame F. For the ad identifier 300, this means that the scene identifier 310 using a fingerprint 222 of a rank may struggle to identify an advertisement when the advertisement has some similar pixel values $V_P$ to live programming.

FIGS. 3A-3F illustrate examples of the ad identifier 300. The ad identifier 300 includes a scene identifier 310, a matcher 320 and an ad indicator 330. The scene identifier 310 is configured to determine from the media stream S when a scene 302 changes to another scene 302 (i.e. a scene change 312). Generally, a scene 302 is a series of sequential frames $F_{1-n}$ with a similar pixel value $V_p$. The scene 302 has similar pixel values $V_p$ because each frame F typically corresponds to a fraction of a second based on a frame rate R. As a fraction of a second, subject matter captured as an audio visual image represented by each frame F is unable to change quickly unless the scene 302 changes. Therefore, the at least one pixel value $V_p$ represented by a fingerprint 222 may determine a scene change 312 by a dissimilarity in the pixel value $V_P$ between fingerprints 222 corresponding to two sequentially adjacent frames $F_{adj}$, $F_{1-n}$. When the scene identifier 310 determines a scene change 312, the matcher 320 is configured to determine whether a subsequent scene 304 of the scene change 312 corresponds to an ad (e.g., an ad within the ad scene database 250). When the subsequent scene 304 corresponds to an ad, the ad indicator 330 is configured to provide an identification 332 for at least one broadcast frame $F_B$ of the media stream S corresponding to the subsequent scene 304.

Throughout FIGS. 3A-3F a dotted box generally indicates a selection of an element or elements to illustrate functionality of ad identifier 300. For example, in some illustrations, the dotted box indicates the selection of element(s) as an input or an output of the ad identifier 300. In other illustrations, the dotted box indicates a logic decision of hardware and/or software related to the ad identifier 300.

Figure 3A:
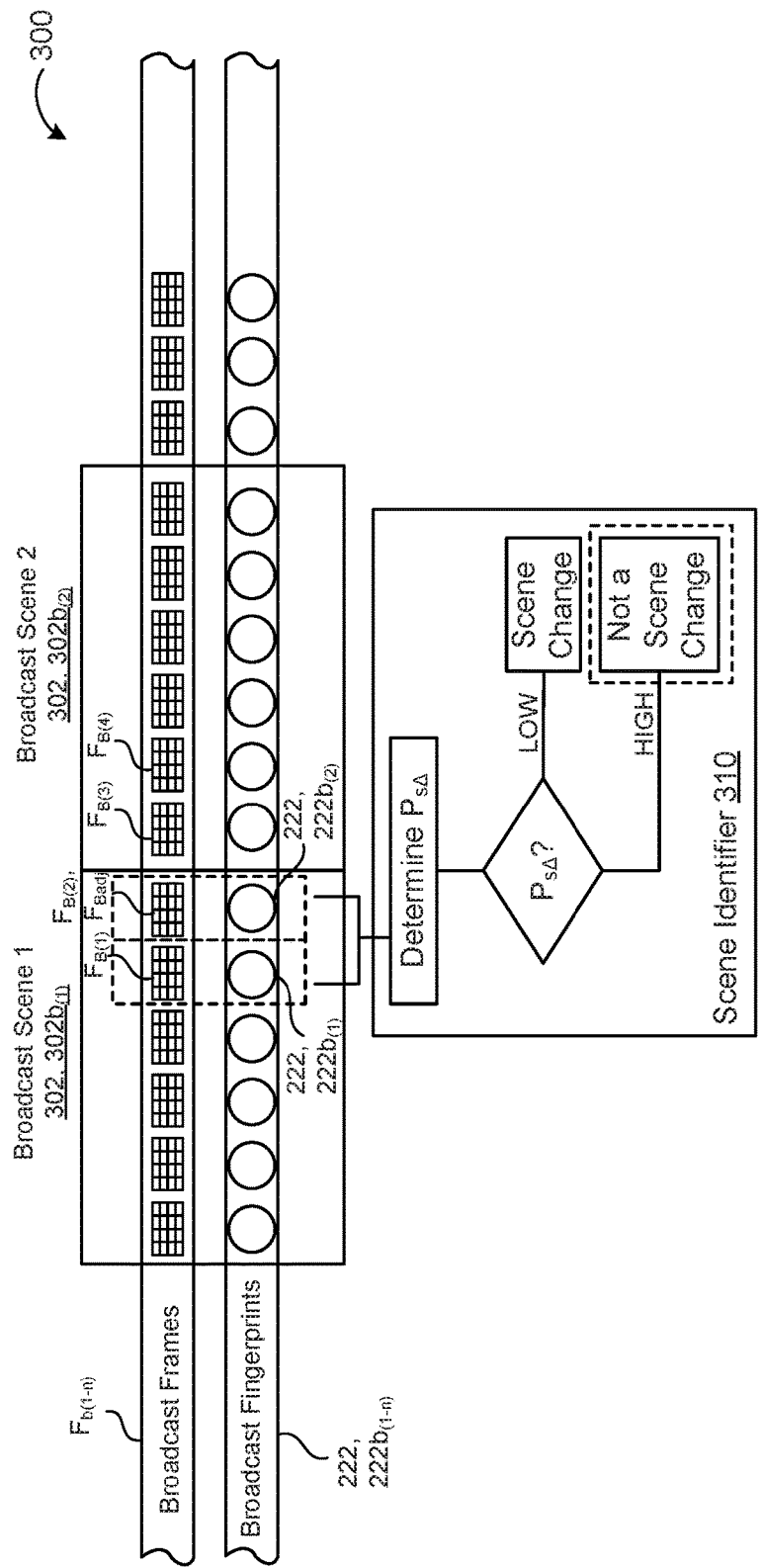
FIG. 3A-3F are schematic views of example ad identifiers.
Figure 3B:
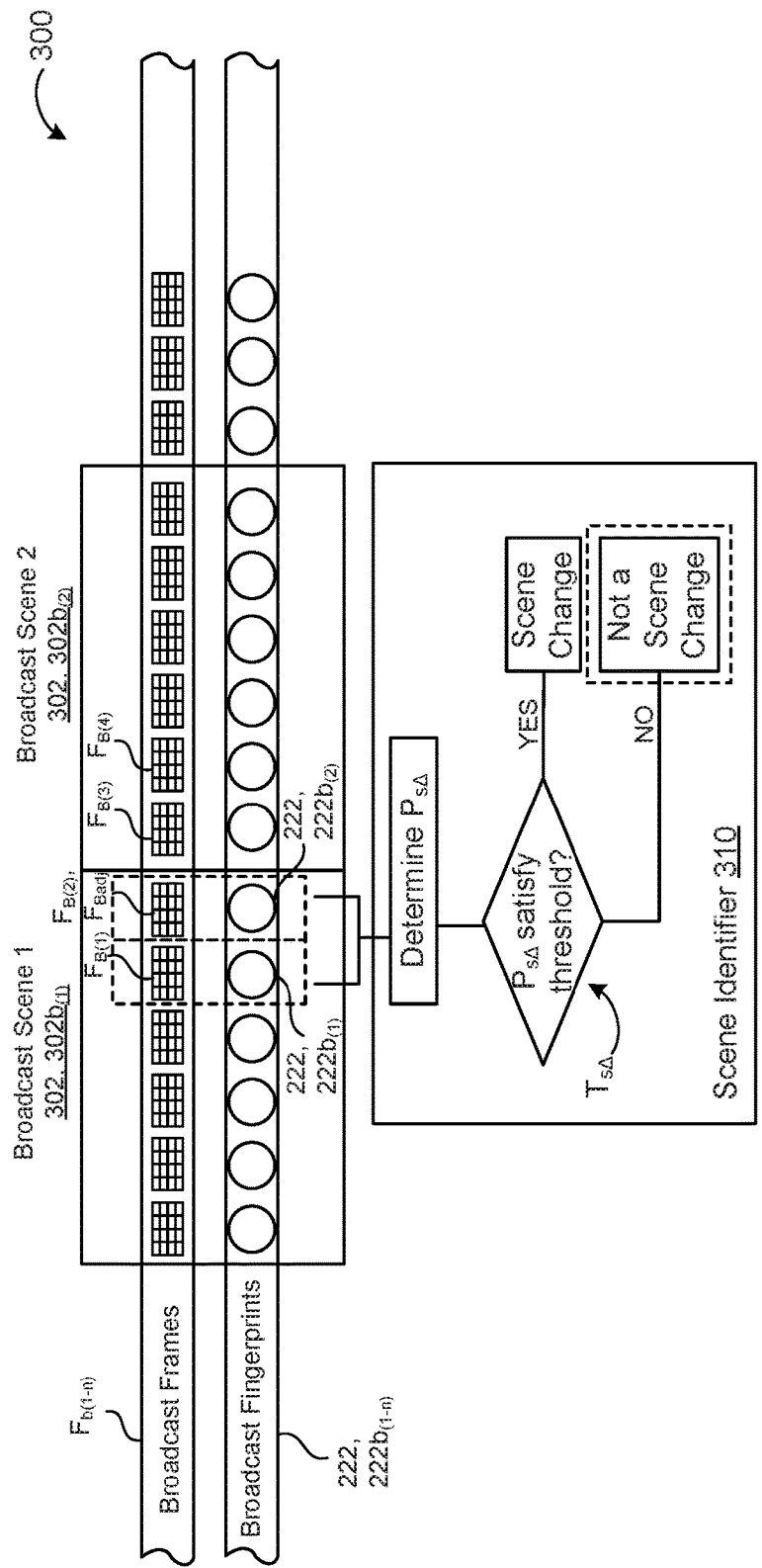

FIGS. 3A and 3B show examples of the scene identifier 310 portion of the ad identifier 300. The scene identifier 310 receives broadcast fingerprints 222, 222b indicative of broadcast frames $F_{B(1-n)}$ of the media stream S. A sequence of broadcast frames $F_{B(1-n)}$ with similar pixel values $V_p$ define a broadcast scene 302, 302b such that the media stream S includes a series of broadcast scenes 302, 302b(1-n). The scene identifier 310 determines a scene change 312 between a first broadcast scene 302, $302b_{(1)}$ and a second broadcast scene 302, $302b_{(2)}$ based on a scene-change correlation. The scene-change correlation is a measurement of similarity indicating a similarity between frames F and/or fingerprints 222 corresponding to frames F. The measurement of similarity may be a quantitative correlation such as a statistical correlation that measures associations between two variables (e.g., a Pearson correlation, a Kendall correlation, or a Spearman correlation). In some implementations, the scene change correlation has different similarity levels where each similarity level indicates a different degree of similarity between frames F and/or fingerprints 222 corresponding to frames F. FIG. 3A depicts a basic example where the scene-change correlation is a scene change Pearson correlation coefficient $P_{s\Delta}$. In this example, the scene change Pearson correlation coefficient $P_{s\Delta}$ has two similarity levels, a high similarity and a low similarity. As an example, the high and low similarity correspond to discrete quantitative measurement ranges (e.g., low=0-0.50 and high=0.051-1.0). These discrete quantitative measurement ranges may be pre-programmed for the scene identifier 310 or adjusted based on the scene-change correlation measured at the scene identifier 310.

In some examples, the scene identifier 310 identifies the scene change 312 by determining the scene-change Pearson correlation coefficient $P_{s\Delta}$ between each sequentially adjacent (i.e. neighboring) pair of broadcast frames $F_{B(1-n)}$, $F_{Badj}$ within the media stream S. In these examples, the scene identifier 310 determines the scene-change Pearson correlation coefficient $P_{s\Delta}$ between a first broadcast fingerprint 222, $222b_{(1)}$ of a first broadcast frame $F_{B(1)}$ of the pair of broadcast frames $F_{B(1-n)}$, $F_{Badj}$ and a second broadcast fingerprint 222, $222b_{(2)}$ of a second broadcast frame $F_{B(2)}$ of the pair of broadcast frames $F_{B(1-n)}$, $F_{Badj}$. In some implementations, such as FIGS. 3C and 3D, when the scene identifier 310 determines that the scene-change Pearson correlation coefficient $P_{s\Delta}$ between a sequentially adjacent pair of broadcast frames $F_{B(1-n)}$, $F_{Badj}$ corresponds to a scene change 312, the scene identifier 310 identifies a first broadcast scene 302, $302b_{(1)}$ and a second broadcast scene 302, $302b_{(2)}$. In other words, the scene identifier 310 identifies the second broadcast scene 302, $302b_{(2)}$ as the subsequent scene 304 of the first broadcast scene 302, $302b_{(1)}$. For example, the scene identifier 310 identifies the first broadcast fingerprint 222, $222b_{(1)}$ of the pair of broadcast frames $F_{B(1-n)}$, $F_{Badj}$ as a last broadcast fingerprint 222, $222b_{(L)}$ of a last broadcast frame $F_{B(L)}$ of a first broadcast scene 302, $302b_{(1)}$ and the second broadcast fingerprint 222, $222b_{(2)}$ of the pair of broadcast frames $F_{B(1-n)}$, $F_{Badj}$ as an initial broadcast fingerprint 222, $222b_{(i)}$ of an initial broadcast frame $F_{B(i)}$ of the second broadcast scene 302, $302b_{(2)}$.

Referring further to FIG. 3A, the scene-change Pearson correlation coefficient $P_{s\Delta}$ between broadcast fingerprints 222, 222b corresponding to the pair of broadcast frames $F_{B(1-n)}$, $F_{Badj}$ may be a high measurement (e.g., towards 1.0) or a low measurement (e.g., towards 0). For example, when the scene-change Pearson correlation coefficient $P_{s\Delta}$ is high, the first broadcast fingerprint 222, $222b_{(1)}$ and the second broadcast fingerprint 222, $222b_{(2)}$ of the pair of broadcast frames $F_{B(1-n)}$, $F_{Badj}$ have a similarity that indicates a scene change 312 has not occurred. Conversely, when the scene-change Pearson correlation coefficient $P_{s\Delta}$ is low, the first broadcast fingerprint 222, $222b_{(1)}$ and the second broadcast fingerprint 222, $222b_{(2)}$ of the pair of broadcast frames $F_{B(1-n)}$, $F_{Badj}$ have a dissimilarity that indicates a scene change 312 has occurred. In some examples, the scene identifier 310 determines whether the scene-change Pearson correlation coefficient $P_{s\Delta}$ satisfies a scene-change correlation threshold $T_{s\Delta}$. When the scene-change Pearson correlation coefficient $P_{s\Delta}$ satisfies the scene-change correlation threshold $T_{s\Delta}$, the scene identifier 310 may determine the scene change 312 has or has not occurred, depending on how the scene identifier 310 is configured. As an example, FIG. 3B illustrates the scene identifier 310 configured to identify that the scene change 312 has occurred when the scene-change Pearson correlation coefficient $P_{s\Delta}$ satisfies the scene-change correlation threshold $T_{s\Delta}$. Both FIGS. 3A and 3B illustrate that the scene identifier 310 has determined that the scene change 312 has not occurred between the first broadcast fingerprint 222, $222b_{(1)}$ and the second broadcast fingerprint 222, $222b_{(2)}$ of the pair of broadcast frames $F_{B(1-n)}$, $F_{Badj}$.

As shown in FIGS. 3C-3F, the ad identifier 300 further includes the matcher 320. The matcher 320 receives ad fingerprints 222, 222a indicative of ad frames $F_{ad(1-n)}$ of ad scenes 302, $302a_{(1-n)}$. In some examples, the matcher 320 may retrieve the ad fingerprints 222, 222a from the ad scene database 250 once the scene identifier 310 determines the scene change 312. In other examples, a content entity may provide the ad fingerprints 222, 222a directly to the matcher 320. Additionally or alternatively, the matcher 320 may include an ad scene database 250 configured to store the ad fingerprints 222, 222a and/or ad frames $F_{ad(1-n)}$. When the scene identifier 310 determines the scene change 312 and identifies that a first broadcast scene 302, $302b_{(1)}$ changes to a second broadcast scene 302, $302b_{(2)}$, the ad identifier 300 determines whether the second broadcast scene 302, $302b_{(2)}$ is one of the ad scenes 302, $302a_{(1-n)}$. In some implementations, for each ad scene 302, 302a the matcher 320 receives, the matcher 320 determines a match correlation between the respective ad fingerprint 222, 222a corresponding to the ad scene 302, 302a and at least one broadcast fingerprint 222, 222b of the second broadcast scene 302, $302b_{(2)}$. In some examples, the at least one broadcast fingerprint 222, 222b of the second broadcast scene 302, $302b_{(2)}$ is the second broadcast fingerprint 222, $222b_{(2)}$ of the pair of broadcast frames $F_{B(1-n)}$, $F_{Badj}$. In some examples, much like the scene-change correlation, the match correlation is a statistical correlation such as a Pearson correlation, a Kendall correlation, or a Spearman correlation. FIGS. 3C-3F illustrate examples of the match correlation as a match Pearson correlation coefficient $P_M$. For example, the matcher 320 determines the match Pearson correlation coefficient $P_M$ between the at least one broadcast fingerprint 222, 222b of the second broadcast scene 302, 302b and each respective ad fingerprint 222, 222a corresponding to each ad scene 302, 302a.

In some examples, the matcher 320 determines the match correlation between an ad fingerprint block 222, $222a_{(block)}$ corresponding to a plurality of ad fingerprints 222, 222a of the ad scene 302, 302a (e.g., including the respective ad fingerprint 222, 222a) and a broadcast fingerprint block 222, $222b_{(block)}$ corresponding to a plurality of broadcast fingerprints 222, 222b of the second broadcast scene 302, $302b_{(2)}$. Each block of the ad fingerprint block 222, $222a_{(block)}$ and the broadcast fingerprint block 222, $222b_{(block)}$ may include a predetermined number of fingerprints 222. In some implementations, each block includes a similar number of fingerprints 222 such that the match correlation by the matcher 320 compares an equal number of ad fingerprints 222, 222a to an equal number of broadcast fingerprints 222, 222b. For example, each block of the ad fingerprint block 222, 222a$_{(block)}$ and the broadcast fingerprint block 222, 222b$_{(block)}$ corresponds to two seconds of fingerprints 222 such that, at a frame rate of thirty frames per second, each block includes sixty fingerprints (e.g., ad fingerprints 222, 222a$_{(1-60)}$ and broadcast fingerprints 222, 222b$_{(1-60)}$). As illustrative examples, FIGS. 3C, 3D, and 3F depict the matcher 320 performing the match correlation with regard to four ad fingerprints 222, 222a (within a dotted selection box at each ad scene 302, 302a) and four broadcast fingerprints 222, 222b (within a dotted selection box at the broadcast scenes 302, 302b).

In some examples, an ad scene 302, 302a corresponds to an entire advertisement or a portion of an advertisement. Therefore, the ad scene database 250 may include all ad frames F$_{ad(1-n)}$ for an advertisement or any number of ad frames F$_{ad(1-n)}$ relating to an advertisement. In some examples, each ad scene 302, 302a is a set number of frames F$_{ad(1-n)}$ to ensure consistency by the ad identifier 300. For example, assuming each advertisement is unique during the first two seconds of the advertisement, each ad scene 302, 302a corresponds to two second of ad frames F$_{ad(1-n)}$. In this example, when the frame rate is thirty frames per second, two seconds of ad frames F$_{ad(1-n)}$ equates to about sixty ad frames F$_{ad(1-60)}$. In other examples, each ad scene 302, 302a is any amount of ad frames F$_{ad(1-n)}$, but the matcher 320 is configured to determine the match correlation between a set number of ad frames F$_{ad(1-n)}$ (e.g., two seconds of ad frames F$_{ad(1-n)}$) and a similar number broadcast frames F$_{B(1-n)}$ of the second broadcast scene 302, 302b$_{(2)}$ (i.e. subsequent broadcast scene). A set number of ad frames F$_{ad(1-n)}$ may reduce the amount of storage needed for the ad scene database 250. In some situations, reducing the amount of storage needed for the ad scene database 250 enables the matcher 320 to reduce processing power. For example, advertisements often range from a short version of about ten seconds to a long version of about one minute. From a frame perspective, the long version may include over a thousand more frames than the short version. In this respect, the ad scene database 250 may reduce potential storage of over a thousand frames of an entire advertisement to a set number of ad frames F$_{ad(1-n)}$ for each advertisement and utilizes the reduction of storage such that each ad fingerprint 222, 222a incorporates more subframes F$_{sub}$ and thus more pixel values V$_P$ within an ad frame F$_{ad}$. In other words, portions (i.e. a discrete number of ad frames F$_{ad(1-n)}$) of advertisements may allow the matcher 320 to accurately identify that a broadcast scene 302, 302b corresponds to an advertisement because a fingerprint 222 (e.g., an ad fingerprint 222, 222a or a broadcast fingerprint 222, 222b) may represent much larger vectors (e.g., sixteen integer vectors) of pixel values V$_P$ than a fingerprint 222 of solely a single average pixel value V$_P$.

Figure 3C:
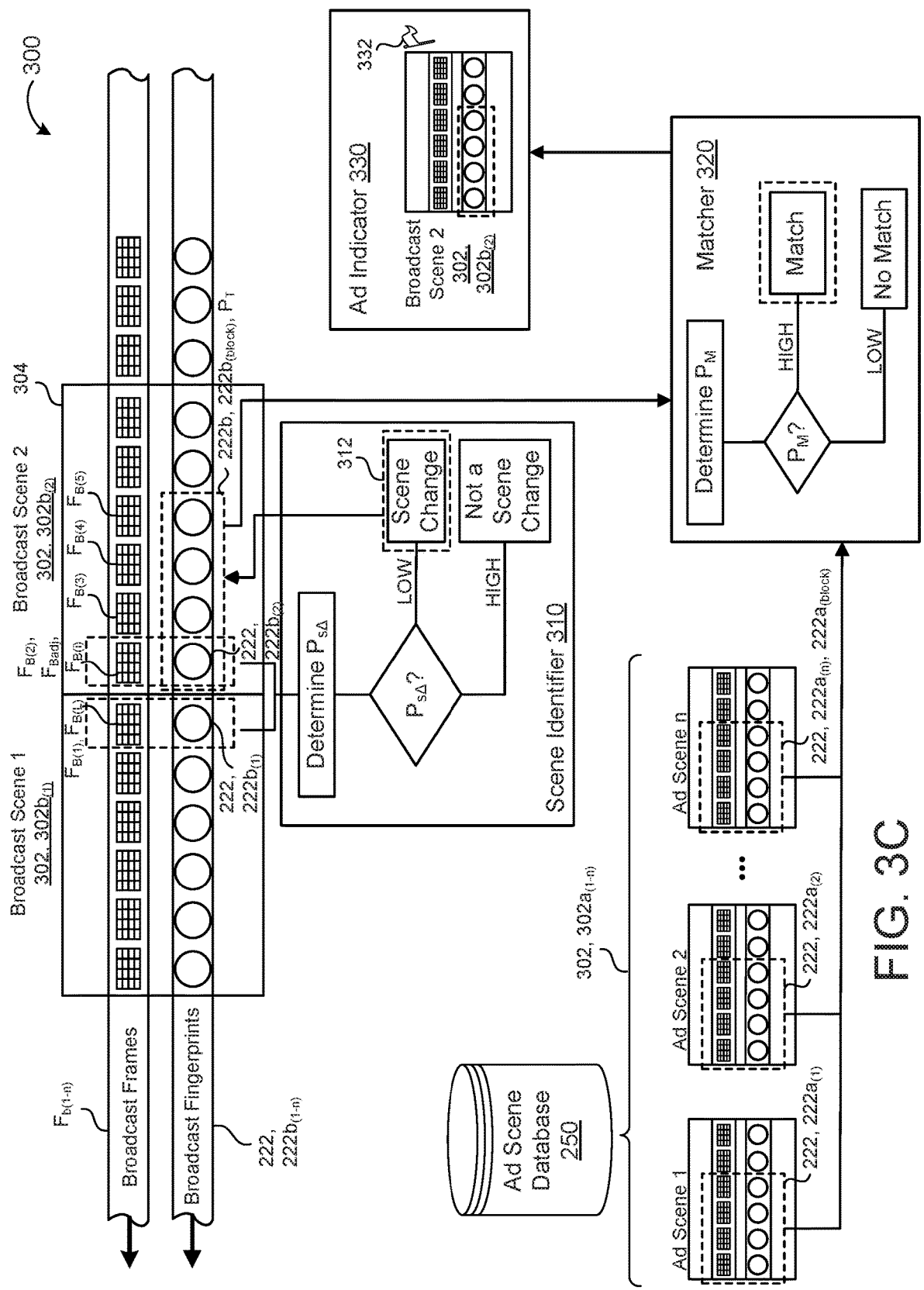
Figure 3D:
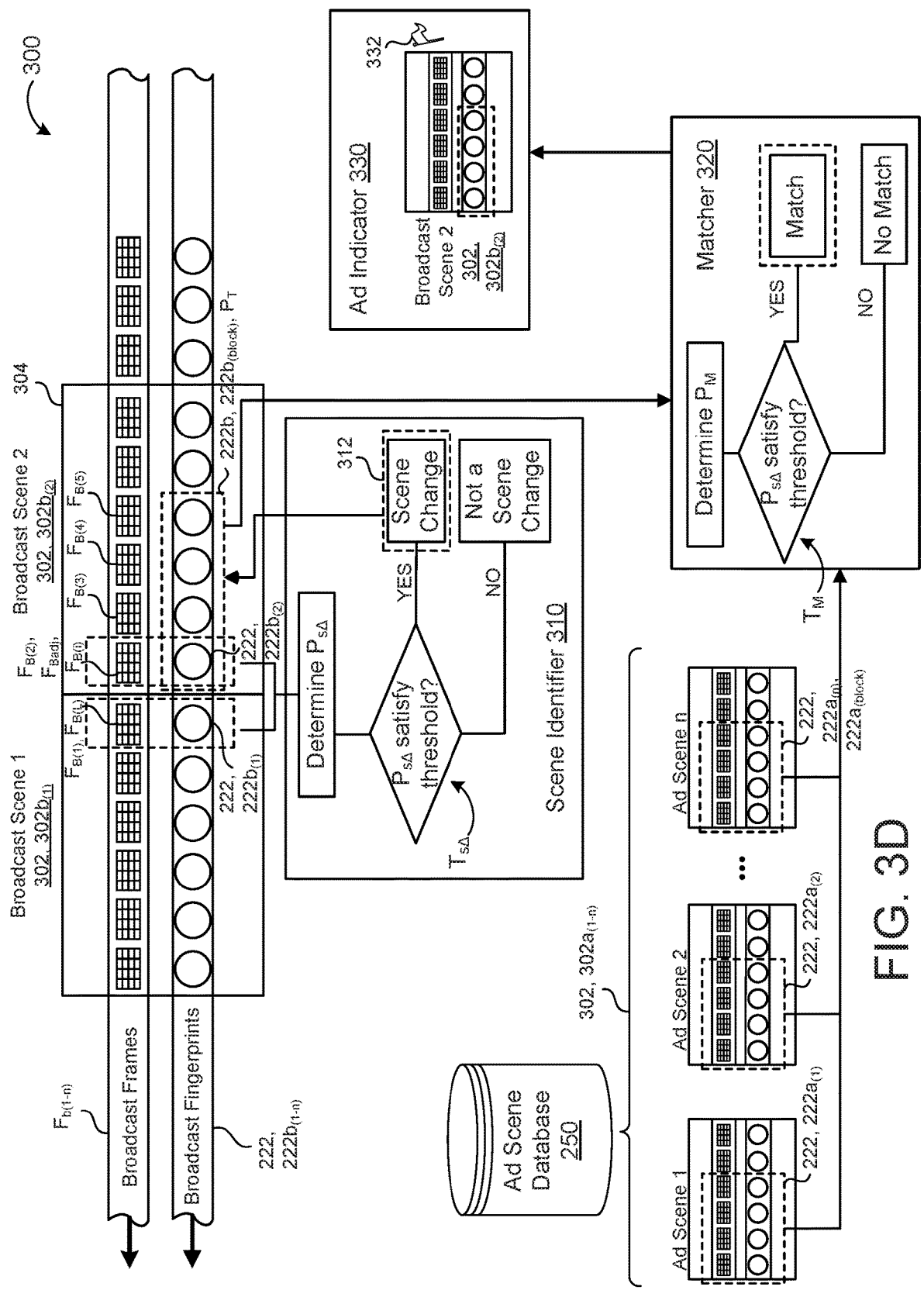

Furthermore, FIGS. 3C and 3D provide examples where the scene identifier 310 determines the scene change 312. In these examples, when the scene identifier 310 determines that the scene-change Pearson correlation coefficient P$_{sΔ}$ between a sequentially adjacent pair of broadcast frames F$_{B(1)}$, F$_{B(2)}$ corresponds to the scene change 312, the scene identifier 310 identifies the first broadcast fingerprint 222, 222b$_{(1)}$ of the pair of broadcast frames F$_{B(1)}$, F$_{B(2)}$ as the last broadcast fingerprint 222, 222b$_{(L)}$ of the last broadcast frame F$_{B(L)}$ of the first broadcast scene 302, 302b$_{(1)}$ and the second broadcast fingerprint 222, 222b$_{(2)}$ of the pair of broadcast frames F$_{B(1)}$, F$_{B(2)}$ as the initial broadcast fingerprint 222, 222b$_{(i)}$ of the initial broadcast frame F$_{B(1)}$ of the second broadcast scene 302, 302b$_{(2)}$. The determination of the scene change 312 triggers the matcher 320 to determine whether the second broadcast scene 302, 302b$_{(2)}$ is one of the ad scenes 302, 302a$_{(1-n)}$. In FIGS. 3C and 3D, the matcher 320 receives ad fingerprints 222, 222a and broadcast fingerprints 222, 222b representing a similar number of frames F$_{(1-n)}$. In some cases, it may be advantageous for the matcher 320 to receive fingerprints 222 of similar dimensions or vectors to streamline data processing hardware and/or memory hardware associated with the ad identifier 300. In some examples, the scene identifier 310 communicates broadcast fingerprints 222, 222b of the subsequent scene 304 to the matcher 320. In other examples, the matcher 320 may retrieve broadcast fingerprints 222, 222b of the subsequent scene 304 when the scene identifier 310 determines the scene change 312. In FIGS. 3C and 3D, the matcher 320 receives broadcast fingerprints 222, 222b relating to four broadcast frames F$_{B(2-5)}$ of the second broadcast scene 302, 302b$_{(2)}$ (i.e. the subsequent scene 304) and ad fingerprints 222, 222a relating to four ad frames F$_{ad(1-4)}$ of each ad scene 302, 302a$_{(1-n)}$. For example, the matcher 320 receives the ad fingerprints 222, 222a from the ad scene database 250.

FIGS. 3C and 3D depict the matcher 320 determining whether the second broadcast scene 302, 302b$_{(2)}$ is one of the ad scenes 302, 302a$_{(1-n)}$ based on the match Pearson correlation coefficient P$_M$. Similar to the scene identifier 310, the matcher 320 may use similarity levels or thresholds for the match Pearson correlation coefficient P$_M$. In some examples, such as FIG. 3C, the matcher 320 determines that the second broadcast scene 302, 302b$_{(2)}$ is one of the ad scenes 302, 302a$_{(1-n)}$ when the match Pearson correlation coefficient P$_M$ corresponds to a similarity level (e.g., a high similarity and a low similarity like FIG. 3A). In FIG. 3C, the matcher 320 has determined that the broadcast fingerprint 222, 222b of the second broadcast scene 302, 302b$_{(2)}$ has a high similarity to at least one ad fingerprint 222, 222a of an ad scene 302, 302a$_{(1-n)}$. In other examples, such as FIG. 3D, the matcher 320 may determine that the second broadcast scene 302, 302b$_{(2)}$ is one of the ad scenes 302, 302a$_{(1-n)}$ when the match Pearson correlation coefficient P$_M$ satisfies a match correlation threshold T$_M$. Similar to the scene-change correlation threshold T$_{sΔ}$ of the scene identifier 310, the match correlation threshold T$_M$ may determine whether the subsequent scene 304 matches an ad scene 302, 302a or not, depending on how the matcher 320 is configured. As an example, FIG. 3D illustrates the matcher 320 configured to identify that the subsequent scene 304 matches an ad scene 302, 302a when the match Pearson correlation coefficient P$_M$ satisfies the match correlation threshold T$_M$. Although FIGS. 3C-3F illustrate the match Pearson correlation coefficient P$_M$ as the match correlation, the matcher 320 may use any statistical correlation in conjunction with similarity levels and/or thresholds. Moreover, although FIGS. 3A-3F illustrate several combinations of scene identifiers 310 and matchers 320, any combination is possible. For example, the figures fail to show an ad identifier 300 with the scene identifier 310 using a threshold while the matcher 320 uses similarity levels or vice versa. The figures also fail to show that the scene identifier 310 may determine a scene change 312, but the matcher 320 does not determine a matching ad scene 302, 302a. This may occur where live-programming changes scenes during a program of the media stream S, but the program does not transition to an advertisement.

In some implementations, the matcher 320 determines the match correlation for each ad scene 302, 302a in relation to at least one broadcast fingerprint 222, 222b of the second broadcast scene 302, 302$b_{(2)}$. With each match correlation, the matcher 320 may be configured to identify the ad scene 302, 302a with a greatest match correlation as the ad scene 302, 302a that matches the at least one broadcast fingerprint 222, 222b of the second broadcast scene 302, 302$b_{(2)}$. For example, this configuration may help the matcher 320 be accurate when ad scenes 302, 302a include similar advertisements, but of varying length.

In some examples, when the scene identifier 310 determines the scene changes 312, the matcher 320 waits a threshold time period $P_T$ after the first broadcast fingerprint 222, 222$b_{(1)}$ of the pair of broadcast frames $F_{B(1)}$, $F_{B(2)}$ corresponding to the scene change 312 before determining whether the second broadcast scene 302, 302$b_{(2)}$ is one of the ad scenes 302, 302$a_{(1-n)}$. In some implementations, the matcher 320 waits the threshold time period $P_T$ after the last broadcast fingerprint 222, 222$b_{(L)}$ of the last broadcast frame $F_{B(L)}$ of the first broadcast scene 302, 302$b_{(1)}$. For example, in FIGS. 3C-3F, the broadcast fingerprint 222, 222b of the second broadcast scene 302, 302$b_{(2)}$ corresponds to the threshold time period $P_T$ of broadcast frames $F_{B(2-5)}$. In other words, the broadcast fingerprint 222, 222b of the second broadcast scene 302, 302$b_{(2)}$ analyzed by the matcher 320 may correspond to more than one broadcast frame $F_{B(1-n)}$. In some examples, the threshold time period $P_T$ functions to account for the set number of ad frames $F_{ad(1-n)}$ received by the matcher 320 for each ad scene 302, 302a. By accounting for the set number of ad frames $F_{ad(1-n)}$, the threshold time period $P_T$ may provide the matcher 320 with an equivalent sized vector or pixel value to compare fingerprints 222. For example, when each ad scene 302, 302a corresponds to two second of ad frames $F_{ad(1-n)}$, the threshold time period $P_T$ is at least two seconds before determining whether the second broadcast scene 302, 302$b_{(2)}$ is one of the ad scenes 302, 302$a_{(1-n)}$. The two seconds may enable the matcher 320 to determine whether the second broadcast scene 302, 302$b_{(2)}$ is one of the ad scenes 302, 302a based on two seconds of broadcast frames $F_{B(1-n)}$.

FIGS. 3C-3F also illustrate the ad indicator 330 of the ad identifier 300. The ad indicator 330 may associate an identification 332 of the second broadcast scene 302, 302$b_{(2)}$ as the one of the ad scenes 302, 302$a_{(1-n)}$ when the match correlation satisfies match criteria of the matcher 320 (e.g., the match correlation threshold $T_M$ or similarity levels). For example, the ad indicator 330 identifies the second broadcast scene 302, 302$b_{(2)}$ as corresponding to the ad scene 302, 302a of the respective ad fingerprint 222, 222a received by the matcher 320 and determined, by the matcher 320, to match the broadcast fingerprint 222, 222b of the second broadcast scene 302, 302$b_{(2)}$. In some examples, the identification 332 is a communication to a content entity or the ACR module 132 such that the second broadcast scene 302, 302$b_{(2)}$ is readily distinguishable during real-time viewing at the media device 30. According to the identification 332, the second broadcast scene 302, 302$b_{(2)}$ that corresponds to an advertisement may be replaced, overlaid, or modified with alternative content. By providing the identification 332 that the second broadcast scene 302, 302$b_{(2)}$ is an advertisement, the ad identifier 300 may allow ACR module 132 to more efficiently and more effectively function at the media device 30. Additionally or alternatively, the identification 332 is an identifier, such as a metadata tag, associated with second broadcast scene 302, 302$b_{(2)}$. Some examples of the identifier include information regarding the corresponding ad scene 302, 302a (e.g., advertiser, product, services, ad length, etc.) or broadcast frame data (e.g., frame location). In other words, the identifier may be any data that may aid a content entity or the ACR module 132 to identify the corresponding ad scene 302, 302a when a media device 30 receives the media stream S. The ad identifier 300 may eliminate some advertisement identification error at the ACR module 132 because the ad identifier 300 provides the identification 332 of an advertisement. Additionally or alternatively, the ad identifier 300 may reduce processing power that the ACR module 132 would otherwise consume performing functions similar to the ad identifier 300.

Some advertisements may be more complicated forms of advertisement. Examples include advertisements nested inside each other, advertisements sequentially adjacent to each other, or advertisements followed by a short segment of normal programming before another advertisement. For example, a golf club manufacturer may have a standard advertisement with close-ups of golf clubs and/or golf swings, but then also partner with a luxury car manufacturer. In this example, there may be multiple different advertisement sequences: the advertisement may start with the car driving to the golf course and end with the standard golf club advertisement and golf club close-ups; the advertisement may start with the golf clubs and end with the golf clubs placed into the car and drove away; or the advertisement may start and end with the car yet contain the golf club standard advertisement in a middle portion. For any of these advertisement sequences, the ad identifier 300 is configured to determine whether the second broadcast scene 302, 302$b_{(2)}$ is within or sequentially adjacent another ad scene 302, 302a.

Figure 3E:
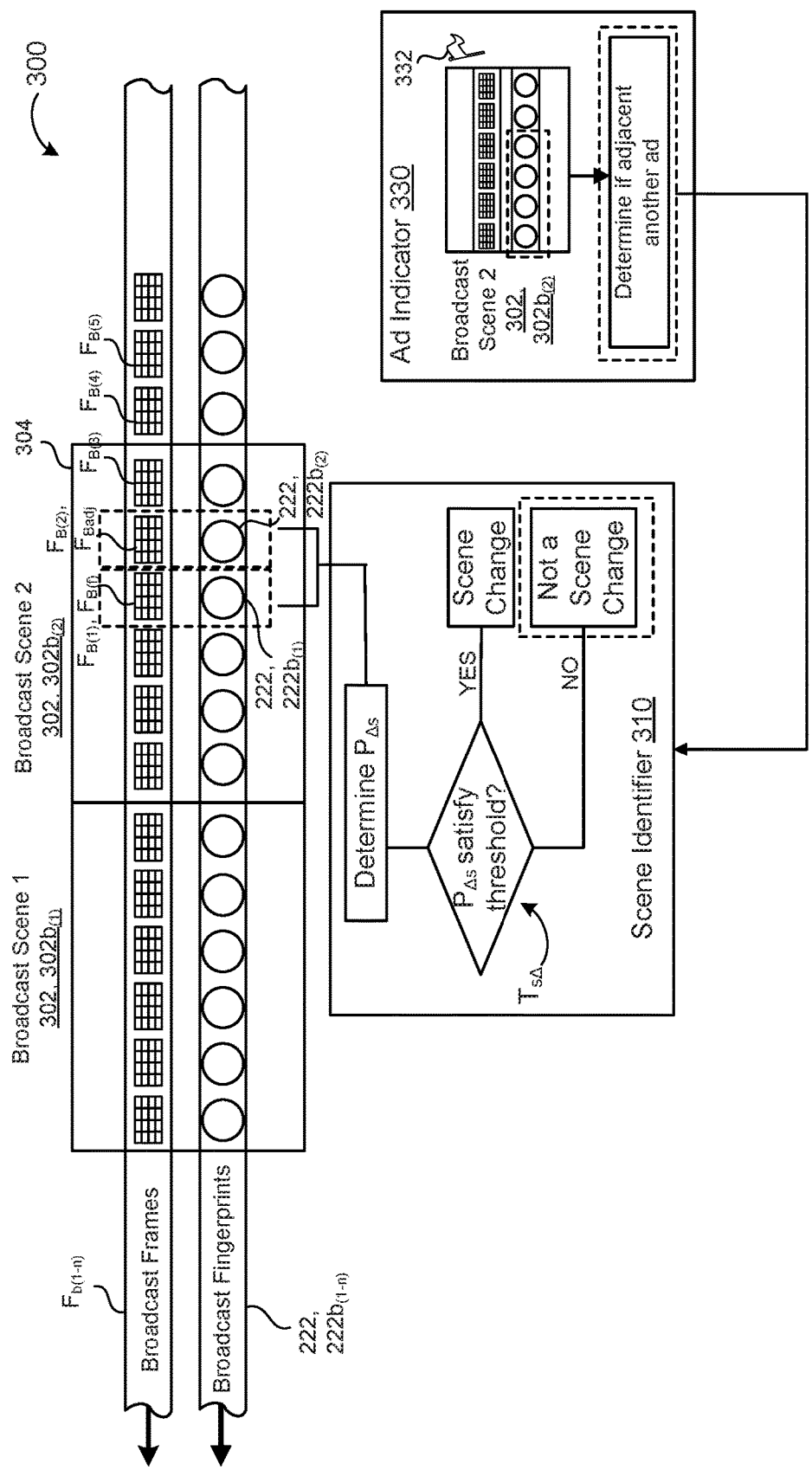
Figure 3F:
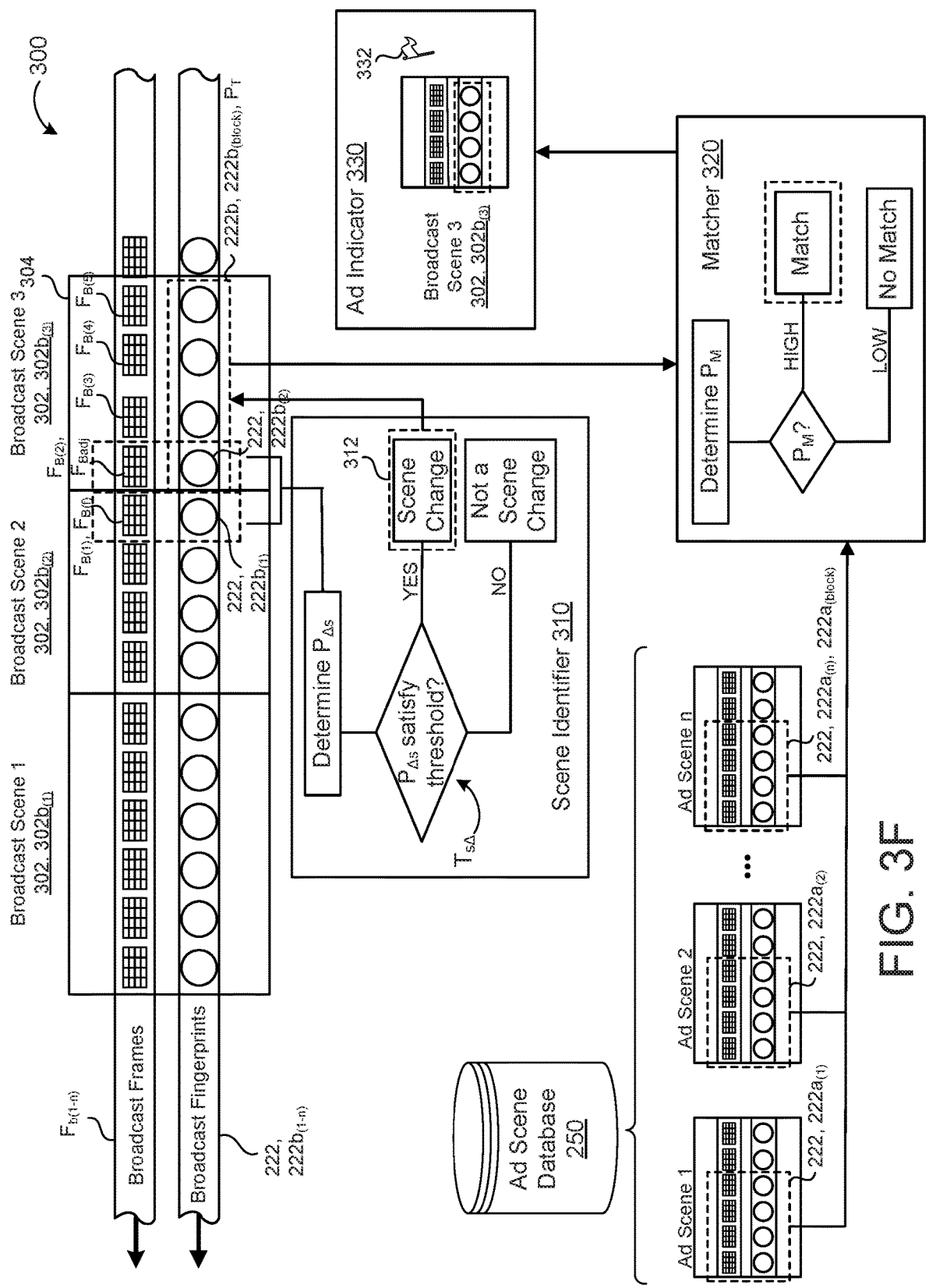

FIGS. 3E and 3F depict the ad identifier 300 determining whether the second broadcast scene 302, 302$b_{(2)}$ is within or sequentially adjacent another ad scene 302, 302a. When the ad indicator 330 provides the identification 332 and/or identifier for the second broadcast scene 302, 302$b_{(2)}$, the identification 332 may trigger the scene identifier 310 to determine whether a third broadcast scene 302, 302$b_{(3)}$ exists at the broadcast frame $F_B$ subsequent the broadcast fingerprint 222, 222b of the second broadcast frame 302, 302$b_{(2)}$. In other words, the scene identifier 310 may determine the scene-change correlation between a subsequent pair of broadcast frames $F_{B(1-n)}$, $F_{Badj}$. In some examples, the scene identifier 310 recursively performs the scene-change correlation between each sequentially adjacent pair of broadcast frames $F_{B(1-n)}$, $F_{Badj}$ of the media stream S. In other examples, a second iteration of the pair of broadcast frames $F_{B(1-n)}$, $F_{Badj}$ begins at a final broadcast frame $F_{B(f)}$ of the threshold time period $P_T$ of broadcast frames $F_{B(1-n)}$ analyzed by the matcher 320 in a first iteration. For example, FIGS. 3E and 3F illustrate the second iteration of the pair of broadcast frames $F_{B(1-n)}$, $F_{Badj}$ begins at the final broadcast frame $F_{B(5)}$ of the threshold time period $P_T$ of broadcast frames $F_{B(1-n)}$ (i.e. broadcast frame $F_{B(5)}$ of FIGS. 3C and 3D). In these examples, the final broadcast frame $F_{B(f)}$ of the threshold time period $P_T$ of broadcast frames $F_{B(1-n)}$ becomes the first broadcast frame $F_{B(1)}$ of the pair of broadcast frames $F_{B(1-n)}$, $F_{Badj}$ for the second iteration. FIG. 3E depicts a process of the scene identifier 310 similar to FIG. 3B except that the scene identifier 310 determines that there is not a scene change 312 within the second broadcast scene 302, 302$b_{(2)}$.

FIG. 3F, on the other hand, is an example of the ad identifier 300 determining an advertisement within or sequentially adjacent the ad scene 302, 302a of the second broadcast scene 302, 302$b_{(2)}$. Here the scene identifier 310 identifies the scene change 312 between the second broadcast scene 302, $302b_{(2)}$ and the third broadcast scene 302, $302b_{(3)}$ The matcher 320 waits the threshold time period $P_T$ (e.g., four broadcast frames $F_{B(2-5)}$) and determines the third broadcast scene 302, $302b_{(3)}$ corresponds to another ad scene 302, 302a. Based on this determination by the matcher 320, the ad indicator 330 associates the identification 332 with the third broadcast scene 302, $302b_{(3)}$.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

Figure 4:
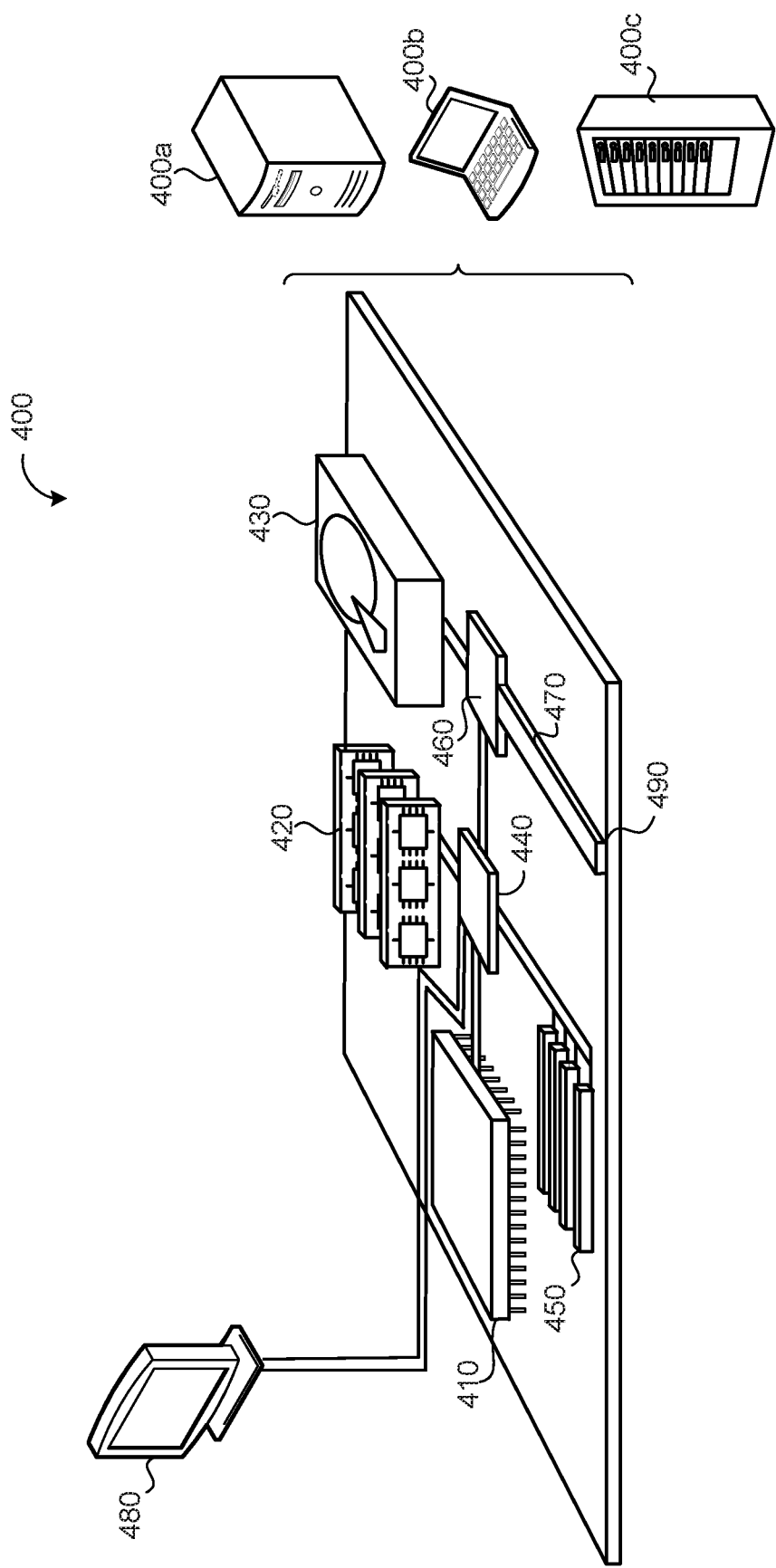
FIG. 4 is a schematic view of an example computing device that may be used to implement the systems and methods described herein.

FIG. 4 is schematic view of an example computing device 400 that may be used to implement the systems and methods described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410, memory 420, a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

The invention claimed is:

1. A method comprising:
receiving, at data processing hardware, broadcast fingerprints indicative of broadcast frames of a media stream, the media stream comprising a series of broadcast scenes;
receiving, at the data processing hardware, advertisement (ad) fingerprints indicative of ad frames of ad scenes;
determining, by the data processing hardware, an extent of similarity between (i) a last broadcast fingerprint of a last broadcast frame of a first broadcast scene and an (ii) initial broadcast fingerprint of an initial broadcast frame of a second broadcast scene;
determining, by the data processing hardware, a scene change between the first broadcast scene and the second broadcast scene based on the determined extent of similarity;
determining, by the data processing hardware, whether the second broadcast scene is one of the ad scenes; and
when the second broadcast scene is one of the ad scenes, associating, by the data processing hardware, an identification of the second broadcast scene as the one of the ad scenes.

2. The method of claim 1, wherein:
determining the extent of similarity comprises determining, by the data processing hardware, a scene-change Pearson correlation coefficient between (i) the initial broadcast fingerprint of the initial broadcast frame of the second broadcast scene and (ii) the last broadcast fingerprint of the last broadcast frame of the first broadcast scene; and
determining the scene change comprises determining, by the data processing hardware, that the scene-change Pearson correlation coefficient satisfies a scene-change correlation threshold.

3. The method of claim 1, wherein:
determining the extent of similarity comprises, for each sequentially adjacent pair of broadcast frames, determining a scene-change Pearson correlation coefficient between:
(i) a first broadcast fingerprint of a first broadcast frame of the pair of broadcast frames, and
(ii) a second broadcast fingerprint of a second broadcast frame of the pair of broadcast frames; and
determining the scene change comprises; for each sequentially adjacent pair of broadcast frames:
(i) determining, by the data processing hardware, whether the scene-change Pearson correlation coefficient satisfies a scene-change correlation threshold; and
(ii) when the scene-change Pearson correlation coefficient satisfies the scene-change correlation threshold:
(a) identifying the first broadcast frame of the pair of broadcast frames as a last broadcast frame of a corresponding broadcast scene; and
(b) identifying the second broadcast frame of the pair of broadcast frames as an initial broadcast frame of a corresponding sequentially adjacent broadcast scene.

4. The method of claim 1, further comprising waiting a threshold time period after the last broadcast fingerprint of the last broadcast frame of the first broadcast scene before determining whether the second broadcast scene is one of the ad scenes.

5. The method of claim 1, wherein determining whether the second broadcast scene is one of the ad scenes comprises:
for each ad fingerprint:
determining, by the data processing hardware, a match Pearson correlation coefficient between the respective ad fingerprint and the second broadcast fingerprint;
determining, by the data processing hardware, whether the match Pearson correlation coefficient satisfies a match correlation threshold; and
when the match Pearson correlation coefficient satisfies the match correlation threshold, identifying, by the data processing hardware, the second broadcast scene as corresponding to the ad scene of the respective ad fingerprint.

6. The method of claim 1, further comprising, when the second broadcast scene is one of the ad scenes, determining, by the data processing hardware, whether the second broadcast scene is within or sequentially adjacent another ad scene.

7. The method of claim 1, further comprising, when the second broadcast scene is one of the ad scenes, associating, by the data processing hardware, an ad identifier with the second broadcast scene.

8. The method of claim 1, wherein each fingerprint represents at least one pixel of the corresponding frame.

9. The method of claim 1, wherein each fingerprint comprises an average pixel value representing a sum of grayscale values of the corresponding frame.

10. The method of claim 1, wherein each fingerprint represents a 16-integer vector corresponding to average pixel values of sixteen sub-frames, the sixteen sub-frames defining a four by four array of the corresponding frame.

11. A method comprising:
receiving, at data processing hardware, broadcast fingerprints indicative of broadcast frames of a media stream;
receiving, at the data processing hardware, advertisement (ad) fingerprints indicative of ad frames of ad scenes; and
for each sequentially adjacent pair of broadcast frames:
(i) determining, by the data processing hardware, a first extent of similarity between: (a) a first broadcast fingerprint of a first broadcast frame of the pair of broadcast frames, and (b) a second broadcast fingerprint of a second broadcast frame of the pair of broadcast frames;
(ii) determining, by the data processing hardware, whether the first extent of similarity is below a first similarity threshold; and
(iii) when the extent of similarity is below the similarity threshold:
(a) identifying, by the data processing hardware, a first broadcast scene as ending at the first broadcast frame;
(b) identifying, by the data processing hardware, a second broadcast scene as starting at the second broadcast frame; and
(c) for each ad fingerprint: (1) determining, by the data processing hardware, a second extent of similarity between the respective ad fingerprint and the second broadcast fingerprint, (2) determining, by the data processing hardware, whether the second extent of similarity is above a second similarity threshold, and (3) when the second extent of similarity is above the second similarity threshold, identifying, by the data processing hardware, the second broadcast scene as the ad scene of the respective ad fingerprint.

12. The method of claim 11, further comprising, when the second broadcast scene is one of the ad scenes, determining, by the data processing hardware; whether the second broadcast scene is within or sequentially adjacent another ad scene.

13. The method of claim 11, further comprising, when the second broadcast scene is one of the ad scenes, associating, by the data processing hardware, an ad identifier with the second broadcast scene.

14. The method of claim 11, wherein each fingerprint represents at least one pixel of the corresponding frame.

15. The method of claim 11, wherein each fingerprint represents a 16-integer vector corresponding to average pixel values of sixteen sub-frames, the sixteen sub-frames defining a four by four array of the corresponding frame.

16. A system comprising:
data processing hardware; and
memory hardware in communication with the data processing hardware, the memory hardware storing instructions that when executed on the data processing hardware cause the data processing hardware to perform operations comprising:
receiving broadcast fingerprints indicative of broadcast frames of a media stream, the media stream comprising a series of broadcast scenes;
receiving advertisement (ad) fingerprints indicative of ad frames of ad scenes;
determining an extent of similarity between (i) a last broadcast fingerprint of a last broadcast frame of a first broadcast scene and an (ii) initial broadcast fingerprint of an initial broadcast frame of a second broadcast scene;
determining a scene change between the first broadcast scene and the second broadcast scene based on the determined extent of similarity;
determining whether the second broadcast scene is one of the ad scenes; and
when the second broadcast scene is one of the ad scenes, associating an identification of the second broadcast scene as the one of the ad scenes.

17. The system of claim 16, wherein:
determining the extent of similarity comprises determining a scene-change Pearson correlation coefficient between (i) the initial broadcast fingerprint of the initial broadcast frame of the second broadcast scene and (ii) the last broadcast fingerprint of the last broadcast frame of the first broadcast scene; and
determining the scene change comprises determining that the scene-change Pearson correlation coefficient satisfies a scene-change correlation threshold.

18. The system of claim 16, wherein:
determining the extent of similarity comprises, for each sequentially adjacent pair of broadcast frames, determining a scene-change Pearson correlation coefficient between:
(i) a first broadcast fingerprint of a first broadcast frame of the pair of broadcast frames, and
a second broadcast fingerprint of a second broadcast frame of the pair of broadcast frames; and
determining the scene change comprises, for each sequentially adjacent pair of broadcast frames:
(i) determining whether the scene-change Pearson correlation coefficient satisfies a scene-change correlation threshold; and
(ii) when the scene-change Pearson correlation coefficient satisfies the scene-change correlation threshold:
(a) identifying the first broadcast frame of the pair of broadcast frames as a last broadcast frame of a corresponding broadcast scene; and
(b) identifying the second broadcast frame of the pair of broadcast frames as an initial broadcast frame of a corresponding sequentially adjacent broadcast scene.

19. The system of claim 16, wherein the operations further comprise waiting a threshold time period after the last broadcast fingerprint of the last broadcast frame of the first broadcast scene before determining whether the second broadcast scene is one of the ad scenes.

20. The system of claim 16, wherein determining whether the second broadcast scene is one of the ad scenes comprises:
for each ad fingerprint:
determining a match Pearson correlation coefficient between the respective ad fingerprint and the second broadcast fingerprint;
determining whether the match Pearson correlation coefficient satisfies a match correlation threshold; and
when the match Pearson correlation coefficient satisfies the match correlation threshold, identifying the second broadcast scene as corresponding to the ad scene of the respective ad fingerprint.

21. The system of claim 16, wherein the operations further comprise, when the second broadcast scene is one of the ad scenes, determining whether the second broadcast scene is within or sequentially adjacent another ad scene.

22. The system of claim 16, wherein the operations further comprise, when the second broadcast scene is one of the ad scenes, associating an ad identifier with the second broadcast scene.

23. The system of claim 16, wherein each fingerprint represents at least one pixel of the corresponding frame.

24. The system of claim 16, wherein each fingerprint comprises an average pixel value representing a sum of grayscale values of the corresponding frame.

25. The system of claim 16, wherein each fingerprint represents a 16-integer vector corresponding to average pixel values of sixteen sub-frames, the sixteen sub-frames defining a four by four array of the corresponding frame.

26. A system comprising:
data processing hardware; and
memory hardware in communication with the data processing hardware, the memory hardware storing instructions that when executed on the data processing hardware cause the data processing hardware to perform operations comprising:
receiving broadcast fingerprints indicative of broadcast frames of a media stream;
receiving advertisement (ad) fingerprints indicative of ad frames of ad scenes; and
for each sequentially adjacent pair of broadcast frames:
(i) determining, by the data processing hardware, a first extent of similarity between: (a) a first broadcast fingerprint of a first broadcast frame of the pair of broadcast frames, and (b) a second broadcast fingerprint of a second broadcast frame of the pair of broadcast frames;
(ii) determining, by the data processing hardware, whether the first extent of similarity is below a first similarity threshold; and
(iii) when the extent of similarity is below the similarity threshold:
(a) identifying, by the data processing hardware, a first broadcast scene as ending at the first broadcast frame;
(b) identifying, by the data processing hardware, a second broadcast scene as starting at the second broadcast frame; and
(c) for each ad fingerprint: (1) determining, by the data processing hardware, a second extent of similarity between the respective ad fingerprint and the second broadcast fingerprint, (2) determining, by the data processing hardware, whether the second extent of similarity is above a second similarity threshold, and (3) when the second extent of similarity is above the second similarity threshold, identifying, by the data processing hardware, the second broadcast scene as the ad scene of the respective ad fingerprint.

27. The system of claim 26, wherein the operations further comprise, when the second broadcast scene is one of the ad scenes, determining whether the second broadcast scene is within or sequentially adjacent another ad scene.

28. The system of claim 26, wherein the operations further comprise, when the second broadcast scene is one of the ad scenes, associating an ad identifier with the second broadcast scene.

29. The system of claim 26, wherein each fingerprint represents at least one pixel of the corresponding frame.

30. The system of claim 26, wherein each fingerprint represents a 16-integer vector corresponding to average pixel values of sixteen sub-frames, the sixteen sub-frames defining a four by four array of the corresponding frame.

* * * * *